US010944449B2

(12) United States Patent
Xie et al.

(10) Patent No.: US 10,944,449 B2
(45) Date of Patent: Mar. 9, 2021

(54) APPARATUS AND METHOD IN WIRELESS COMMUNICATION SYSTEM, AND COMPUTER READABLE STORAGE MEDIUM

(71) Applicant: Sony Corporation, Tokyo (JP)

(72) Inventors: Yuxuan Xie, Beijing (CN); Qimei Cui, Beijing (CN); Tao Cui, Beijing (CN); Huiling Zuo, Beijing (CN); Song Wang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/638,473

(22) PCT Filed: Nov. 9, 2018

(86) PCT No.: PCT/CN2018/114781
§ 371 (c)(1),
(2) Date: Feb. 12, 2020

(87) PCT Pub. No.: WO2019/091446
PCT Pub. Date: May 16, 2019

(65) Prior Publication Data
US 2020/0366337 A1 Nov. 19, 2020

(30) Foreign Application Priority Data
Nov. 10, 2017 (CN) .......................... 201711106060.1

(51) Int. Cl.
*H04B 7/024* (2017.01)
*H04W 16/14* (2009.01)
(Continued)

(52) U.S. Cl.
CPC ............ *H04B 7/024* (2013.01); *H04W 16/14* (2013.01); *H04W 64/00* (2013.01); *H04W 74/0808* (2013.01); *H04W 88/12* (2013.01)

(58) Field of Classification Search
CPC ...... H04B 7/024; H04W 16/14; H04W 64/00; H04W 74/0808; H04W 88/12
(Continued)

(56) References Cited

U.S. PATENT DOCUMENTS

2015/0146680 A1* 5/2015 Luo ..................... H04B 7/0452
370/330
2016/0037352 A1* 2/2016 Wei ..................... H04L 27/2601
455/454
(Continued)

FOREIGN PATENT DOCUMENTS

| CN | 105682101 A | 6/2016 |
|---|---|---|
| CN | 106162922 A | 11/2016 |
| CN | 106455000 A | 2/2017 |

OTHER PUBLICATIONS

International Search Report and Written Opinion dated Jan. 30, 2019 for PCT/CN2018/114781 filed on Nov. 9, 2018, 8 pages including English Translation of the International Search Report.
(Continued)

*Primary Examiner* — Mong-Thuy T Tran
(74) *Attorney, Agent, or Firm* — Xsensus LLP

(57) ABSTRACT

Disclosed are an apparatus and method in a wireless communication system, and a computer readable storage medium. The apparatus comprises a processing circuit, the processing circuit being configured to: instruct one or more second base stations to assess an idle channel for an unauthorized frequency band on the basis of position information of the one or more second base stations and position information of a user equipment such that the one or more second base stations control access to the unauthorized frequency band on the basis of information of the assessment result relating to the idle channel. According to at least one aspect of an embodiment of the present disclosure, accessing a channel on an unauthorized frequency band of, for example, 60 GHz on the basis of position information may improve the speed and reliability of channel access.

16 Claims, 16 Drawing Sheets

(51) Int. Cl.
*H04W 64/00* (2009.01)
*H04W 74/08* (2009.01)
*H04W 88/12* (2009.01)

(58) Field of Classification Search
USPC ........................................................ 455/454
See application file for complete search history.

(56) References Cited

U.S. PATENT DOCUMENTS

| | | | |
|---|---|---|---|
| 2016/0119791 A1* | 4/2016 | Koskinen | H04W 48/08 |
| | | | 455/454 |
| 2016/0249224 A1* | 8/2016 | Prasad | H04W 72/085 |
| 2016/0337176 A1* | 11/2016 | Lindoff | H04W 24/02 |
| 2016/0337177 A1* | 11/2016 | Lindoff | H04W 72/0453 |
| 2017/0238320 A1* | 8/2017 | Fukuta | H04W 72/04 |
| | | | 370/329 |
| 2017/0257195 A1 | 9/2017 | Maaref | |
| 2018/0176792 A1* | 6/2018 | Egner | H04W 24/02 |
| 2019/0109682 A1* | 4/2019 | Ahn | H04L 5/0035 |

OTHER PUBLICATIONS

ZTE and ZTE Microelectronics, "Discussion on Measurement and RS Design for CLI Mitigation," 3GPP TSG RAN WG1 AH_NR No. 1 Meeting, R1-1700271, Spokane, Washington, USA, Jan. 16-20, 2017, pp. 1-8.

* cited by examiner

APPARATUS AND METHOD IN WIRELESS COMMUNICATION SYSTEM, AND COMPUTER READABLE STORAGE MEDIUM

CROSS-REFERENCE TO RELATED APPLICATIONS

This application is based on PCT filing PCT/CN2018/114781, filed Nov. 9, 2018, which claims the priority to Chinese Patent Application No. 201711106060.1, filed with the Chinese Patent Office on Nov. 10, 2017, each of which is incorporated herein by reference in its entirety.

FIELD

The present disclosure generally relates to the technical field of wireless communication, and in particular to a device and a method in a wireless communication system and a computer readable storage medium for accessing to unlicensed bands reliably and efficiently.

BACKGROUND

With the development and evolution of wireless networks, the wireless networks are carrying more and more services, and therefore additional spectrum resources are needed to support a large amount of data transmission. The utilization of spectrum resources in unlicensed bands has been attracting attention. Beamforming and spatial multiplexing are important aspects of New Radio (NR) operations in the mmWave band, and a channel access process needs to be improved for NR operations on unlicensed bands.

However, for operations on unlicensed bands in NR, interferences are no longer omni-directional, which results in that transmission beams from a first transmitter may not be monitored by an adjacent second transmitter, and therefore, a collision may occur when the second transmitter starts a transmission. Therefore, in a case of narrow transmission/reception beams, there is a need to improve the channel estimation and collision avoidance solutions for the conventional unlicensed bands with wide transmission/reception beams.

SUMMARY

A brief overview of the present disclosure is given hereinafter, so as to provide basic understanding regarding some aspects of the present disclosure. However, it should be understood that this overview is not an exhaustive overview of the present disclosure and is not intended to determine a critical part or an important part of the present disclosure, or limit the scope of the present disclosure. The overview is only intended to give some concepts of the present disclosure in a simplified way, as a preface of detailed description given later.

In view of the above issues, an object of the present disclosure is to provide a device and a method in a wireless communication system and a computer readable storage medium for enabling a reliable and efficient channel access to unlicensed bands based on position information.

According to one aspect of the present disclosure, a device in a wireless communication system is provided. The wireless communication system includes a first base station operating on a licensed band and one or more second base stations operating on an unlicensed band. The device includes processing circuitry configured to instruct, based on position information of the one or more second base stations and position information of a user equipment, the one or more second base stations to perform clear channel assessment for the unlicensed band, so that the one or more second base stations control access to the unlicensed band based on information about a result of clear channel assessment.

According to another aspect of the present disclosure, a device in a wireless communication system is further provided. The wireless communication system includes a first base station operating on a licensed band and one or more second base stations operating on an unlicensed band. The device includes processing circuitry configured to: perform clear channel assessment for the unlicensed band according to an instruction made by the first base station based on position information of the one or more second base stations and position information of a user equipment; and control, based on information about a result of clear channel assessment, access to the unlicensed band of a second base station in which the device is located.

According to another aspect of the present disclosure, a device in a wireless communication system is further provided. The wireless communication system includes a first base station operating on a licensed band and one or more second base stations operating on an unlicensed band. The device includes processing circuitry configured to: report, according to an instruction from the first base station, position information of a user equipment to the first base station in real time, for the first base station to instruct, based on position information of the one or more second base stations and the position information of the user equipment, the one or more second base stations to perform clear channel assessment for the unlicensed band, so that the one or more second base stations control access to the unlicensed band based on information about a result of clear channel assessment.

According to another aspect of the present disclosure, a method in a wireless communication system is further provided. The wireless communication system includes a first base station operating on a licensed band and one or more second base stations operating on an unlicensed band. The method includes instructing, based on position information of the one or more second base stations and position information of a user equipment, the one or more second base stations to perform clear channel assessment for the unlicensed band, so that the one or more second base stations control access to the unlicensed band based on information about a result of clear channel assessment.

According to another aspect of the present disclosure, a method in a wireless communication system is further provided. The wireless communication system includes a first base station operating on a licensed band and one or more second base stations operating on an unlicensed band. The method includes: performing clear channel assessment for the unlicensed band, according to an instruction made by the first base station based on position information of the one or more second base stations and position information of a user equipment; and controlling, based on information about a result of clear channel assessment, access to the unlicensed band of each of the one or more second base stations.

According to another aspect of the present disclosure, a method in a wireless communication system is further provided. The wireless communication system includes a first base station operating on a licensed band and one or more second base stations operating on an unlicensed band. The method includes reporting, according to an instruction from the first base station, position information of a user equipment to the first base station in real time, for the first base station to instruct, based on position information of the one or more second base stations and the position information of the user equipment, the one or more second base stations to perform clear channel assessment for the unlicensed band, so that the one or more second base stations control access to the unlicensed band based on information about a result of clear channel assessment.

According to another aspect of the present disclosure, a computer readable storage medium storing executable instructions is further provided. The executable instructions, when being executed by a computer, cause the computer to perform the above method(s) in the wireless communication system.

According to other aspects of the present disclosure, computer program codes and computer program products for implementing the above methods according to the present disclosure are further provided.

According to the embodiment of the present disclosure, channel access on an unlicensed band is implemented based on position information. Therefore, when compared with the conventional technology in which clear channel assessment (CCA) is performed with assistance of a user equipment to implement channel access, the accuracy of the result of assessment can be improved, the workload of the user equipment can be reduced, and the time taken by performing clear channel assessment and reporting results by the user equipment can be saved, thus improving the efficiency.

Other aspects of the embodiments of the present disclosure are given in the following description, in which the detailed description is used for fully disclosing, without limiting, preferred embodiments of the disclosed disclosure.

BRIEF DESCRIPTION OF THE DRAWINGS

The present disclosure can be understood better with reference to the detail description given in conjunction with the drawings in the following. The same or similar element is indicated by the same or similar reference numeral throughout all the drawings. The accompanying drawings together with the following detailed description are incorporated into the specification and form a part of the specification, and serve to further illustrate the preferred embodiments of the present disclosure and to explain the principle and advantages of the present disclosure by way of example. In the drawings.

DETAILED DESCRIPTION OF EMBODIMENTS

Figure 1:
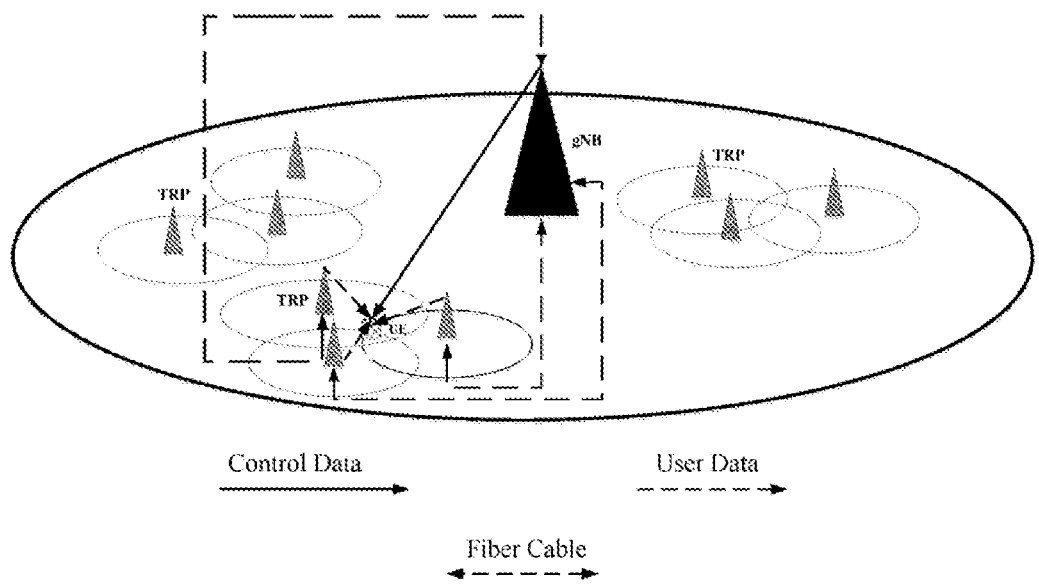
FIG. 1 is a schematic diagram showing an example of a network architecture of a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system-related and business-related constraining conditions which will vary from one implementation to another. Furthermore, it should also be understood that although the development work may be very complicated and time-consuming, for those skilled in the art benefiting from the present disclosure, such development work is only a routine task.

It is further to be noted here that, to avoid obscuring the present disclosure due to unnecessary details, only the device structure and/or processing step closely related to the solution of the present disclosure are shown in the drawings, and other details less related to the present disclosure are omitted.

Hereinafter, embodiments of the present disclosure are described in detail with reference to FIGS. 1 to 23. Hereinafter, description will be made in the following order.

1. Configuration example on a first base station side according to the present disclosure (first embodiment)
   1-1. First example (in a case of centralized scheduling)
   1-2. Second example (in a case of distributed scheduling)
2. Configuration example on a second base station side according to the present disclosure (second embodiment)
   2-1. First example (in a case of centralized scheduling)
   2-2. Second example (in a case of distributed scheduling)
3. Configuration example on a user equipment side according to the present disclosure (third embodiment)
4. Signaling interaction process according to the present disclosure
   4-1. In a case of centralized scheduling
   4-2. In a case of distributed scheduling
5. Method embodiment according to the present disclosure
6. Computer device for implementing the device and the method according to the embodiments of the present disclosure
7. Application example of the technology according to the present disclosure
   7-1. Application Example on Base Station
   7-2. Application example on User Equipment First, an example of an application scenario according to the technology of the present disclosure is described with reference to FIG. 1. FIG. 1 is a schematic diagram showing an example of a network architecture of a wireless communication system according to an embodiment of the present disclosure.

The wireless communication system according to an embodiment of the present disclosure may include a first base station operating on a licensed band and one or more second base stations operating on an unlicensed band. It should be noted here that, the base station mentioned in the present disclosure may be implemented as a gNodeB (gNB), any type of evolved Node B (eNB) such as a macro eNB and a small eNB, and a transmission receiving point (TRP) and the like. The small eNB such as a pico eNB, a micro eNB and a home (femto-cell) eNB may cover a cell smaller than a macro cell. Alternatively, the base station may also be implemented as any other type of base station, such as a Node B and a base transceiver station (BTS). The base station may include: a body configured to control wireless communication (also referred to as a base station apparatus); and one or more remote radio heads (RRH) arranged at a position different from the position of the body. In addition, various types of terminals may each operate as the base station by temporarily or semi-persistently executing a base station function.

In an example of the network architecture shown in FIG. 1, the first base station is represented as gNB, which provides service functions such as those for a primary cell (Pcell), for example, providing a wide area coverage and transmission of control signaling (for example, scheduling and handover management) on a licensed band to provide services for control plane. The second base station is represented as a transmission receiving point TRP, which provides service functions such as those for a secondary cell (Scell), for example, providing downlink data service on an unlicensed band to provide services for user plane. That is, preferably, the example of the network architecture shown in FIG. 1 is an architecture in which control plane and user plane are separated. Furthermore, it should be noted that in the example shown in FIG. 1, the first base station and second base station are not in co-located co-existence, and are connected to each other via optical fibers.

It should be understood that the network architecture shown in FIG. 1 is merely an example and not a limitation. For example, the first base station serving as the primary cell may also be a macro base station, and the second base station serving as the secondary cell may also be a small base station, and so on.

As a preferred example, the unlicensed band here refers to 60 GHz unlicensed band, As for 60 GHz unlicensed band, a relatively large continuous bandwidth may be available in different regions of the world, thus providing high data rates, and there is a deployment with a limited number of wireless fidelity (Wi-Fi). Although there is high propagation path loss for the 60 GHz band, the usage of this band is very attractive by using directional communication and benefiting from beamforming gain. Due to the short wavelength, it is relatively easy to fabricate a small size multi-element antenna array for beamforming. Moreover, with the communication based on a specific beam direction, higher spatial multiplexing may be obtained to improve a system throughput and spectrum efficiency.

As described above, since there is high propagation path loss for the frequency of the 60 GHz band, preferably, data transmission is performed by using a narrow beam, and therefore the second base station (for example, TRP) is required to be provided with a multi-antenna array. A massive multiple-input multiple-output (mMIMO) system may obtain a high degree of spatial freedom by using a multi-antenna array. With a high spatial resolution, not only spectrum multiplexing can be realized, but also interference to the co-existence neighboring node can be naturally suppressed.

However, it should be understood that, although the technology of the present disclosure is described below by taking the 60 GHz unlicensed band as an example, the present disclosure is not limited thereto, and the present disclosure may be similarly applied to channel access on other unlicensed bands.

1. Configuration Example on a First Base Station Side According to the Present Disclosure (First Embodiment)

Figure 2:
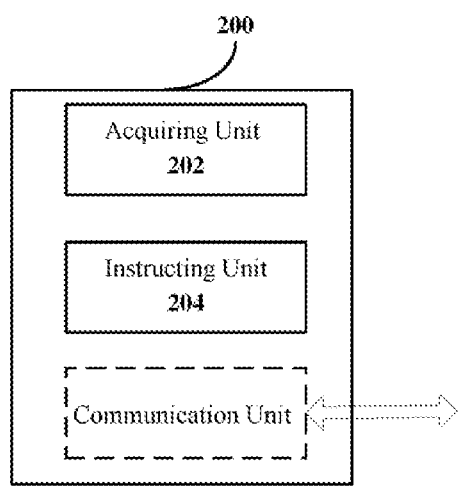
FIG. 2 is a block diagram showing a functional configuration example of a device in a wireless communication system according to a first embodiment of the present disclosure.

FIG. 2 is a block diagram showing a functional configuration example of a device in a wireless communication system according to a first embodiment of the present disclosure. The device may be arranged on the first base station side.

As shown in FIG. 2, a device 200 according to this embodiment may include an acquiring unit 202 and an instructing unit 204. Functional configuration example of each unit is described in detail below.

The acquiring unit 202 may be configured to acquire position information of one or more second base stations and position information of a user equipment. Such position information may be, for example, pre-stored in the storage device at the first base station side, and then the acquiring unit 202 may read such information from the storage device; alternatively, such information may be position information reported by the second base station and the user equipment in real time, which is not limited in the present disclosure.

The instructing unit 204 may be configured to instruct, based on position information of the one or more second base stations and position information of the user equipment, the one or more base stations to perform clear channel assessment for the unlicensed band, so that the one or more second base stations control access to the unlicensed band based on information about a result of clear channel assessment.

Specifically, as a preferred example, the instructing unit 204 may select, based on a distance between each of the one or more second base stations and the user equipment, a first number of second base stations (for example, n second base stations) from the one or more second base stations. Preferably, the n second base stations may be n second base stations which are closest to the user equipment, or n second base stations a distance from which to the user equipment satisfies a predetermined requirement (for example, the distance is less than a predetermined distance threshold). Furthermore, preferably, n is larger than or equal to 3, and is less than the number of all the second base stations (for example, TRPs) in the coverage range of the first base station (for example, gNB). Then, the instructing unit 204 may instruct the n selected second base stations to perform clear channel assessment, so that the n selected base stations may control access to the unlicensed band based on information about the result of clear channel assessment.

The result of clear channel assessment of each second base station may be reported to the first base station, so that the first base station may determine which second base stations may access to the unlicensed band to provide data service for the user equipment. In this case, the information about the result of clear channel assessment can be an instruction from the first base station regarding a determination result with respect to whether the second base stations may access to the unlicensed band, so that the second base stations control access to the unlicensed band by themselves based on the instruction from that base station. Alternatively, the results of clear channel assessment may not be reported to the first base station, and the second base stations determine access to the unlicensed band by themselves based on their respective results of clear channel assessment. In this case, the information about the result of clear channel assessment may be the information obtained by the second base stations by performing the clear channel assessment. The two manners of determining whether the second base stations may access to the unlicensed band may be respectively referred to as "centralized scheduling" (i.e., the first base station centrally determines whether each second base station may access to the unlicensed band), and "distributed scheduling" (i.e., each of the second base stations determines whether it may access to the unlicensed band by itself). Embodiments of the two scheduling manners will be described in detail below.

1-1. First Example (in a Case of Centralized Scheduling)

Figure 3:
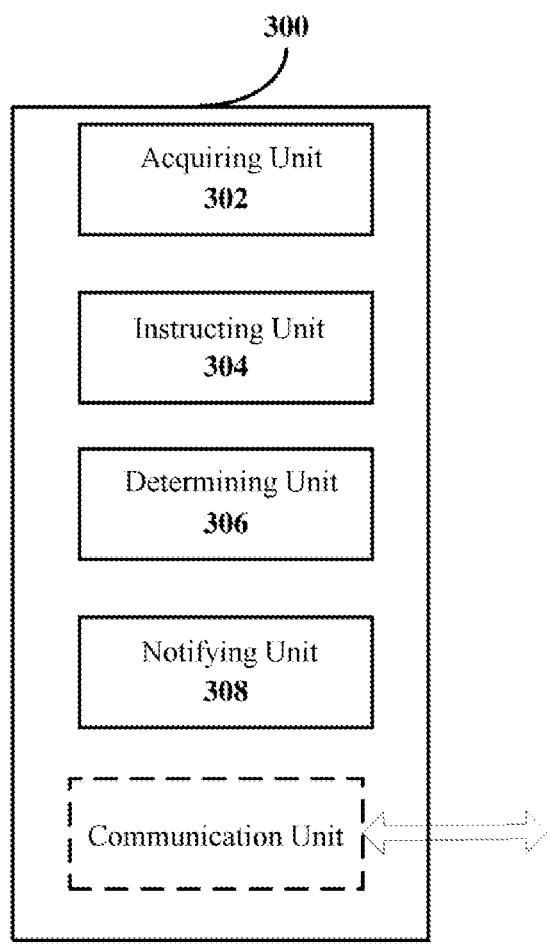
FIG. 3 is a block diagram showing another functional configuration example of a device in a wireless communication system according to the first embodiment of the present disclosure.

FIG. 3 is a block diagram showing another functional configuration example of the device in the wireless communication system according to the first embodiment of the present disclosure.

As shown in FIG. 3, a device 300 according to this example may include an acquiring unit 302, an instructing unit 304, a determining unit 306 and a notifying unit 308. The functional configuration example of the acquiring unit 302 is the same as that of the acquiring unit 202 described above with reference to FIG. 2, which is not repeated herein. Only the functional configuration examples of the instructing unit 304, the determining unit 306 and the notifying unit 308 are described in detail below.

The instructing unit 304 is configured to: instruct the first number of second base stations (for example, n second base stations) to perform omni-directional clear channel assessment, and add a second base station a result of clear channel assessment of which satisfies a predetermined condition into a first set.

Specifically, if the received power measured by a second base station by performing clear channel assessment is less than a predetermined threshold, then it is indicated that there are no interfering nodes (including, but not limited to, an access point AP in a WiFi system) in a range of measurement of the second base station or that the interfering node is sufficiently far away from the second base station. In contrast, if the received power measured by the second base station is larger than the predetermined threshold, then it is indicated that there are interfering nodes in the vicinity of the second base station, so that the second base station may be added into the first set. The above operation is repeated until the first number of second base stations are traversed. Since position information of the second base stations contained in the first set may be used to determine a specific position of the interfering node, the first set may also be referred to as "coordinated measurement set (CMS)". It should be noted that the predetermined threshold for the received power for CCA may be an empirical value or a value determined according to a limited number of experiments in combination with the practical network condition, which is not limited in the present disclosure.

The determining unit 306 may be configured to determine, based on the number of second base stations contained in the first set, access to the unlicensed band of the first number of second base stations.

Specifically, if the first set is determined to be null after a traversal operation, that is, the result of clear channel assessment of each of the n second base stations indicates that there are no interfering APs around the second base station, the determining unit 306 may determine a predetermined second number of second base stations (for example, m second base stations), which are closest to the user equipment and/or whose downlink channel qualities (which may be determined based on a signal to interference plus noise ratio (SINR), a reference signal received power (RSRP) and the like) with respect to the user equipment are best, among the n second base stations, to access to the unlicensed band so as to provide downlink data service for the user equipment.

In addition, if the number of the second base stations in the first set is larger than 0 and smaller than 3, it is indicated that there are interferences. Since specific positions of the interfering nodes cannot be determined only based on position information of one or two second base stations, when determining the second base station which may access the unlicensed band to provide service for the user equipment, the determining unit 306 may exclude the second base stations contained in the first set so as to avoid interference. That is, the determining unit 306 determine, a predetermined second number of second base stations (for example, m second base stations), which are closest to the user equipment and/or whose downlink channel qualities with respect to the user equipment are best, excluding the second base stations in the first set, among the first number of second base stations, to access to the unlicensed band.

It should be noted that, the number m of the second base station which may access to the unlicensed band may be an integer larger than or equal to 1. When m is larger than 1, these second base stations may constitute a coordinated transmission set (CTS), which provides downlink data service for the user equipment by performing coordinated multi-point transmission (CoMP), so that the user equipment may obtain more seamless connectivity and more smooth service when it moves. It should be noted that the coordinated transmission set CTS may also be referred to as "virtual cell (VC)" and that since the second base stations in these virtual cells need to share the unlicensed band and movement of the user equipment with co-existence neighbors, the virtual cells substantially vary dynamically.

Figure 4:
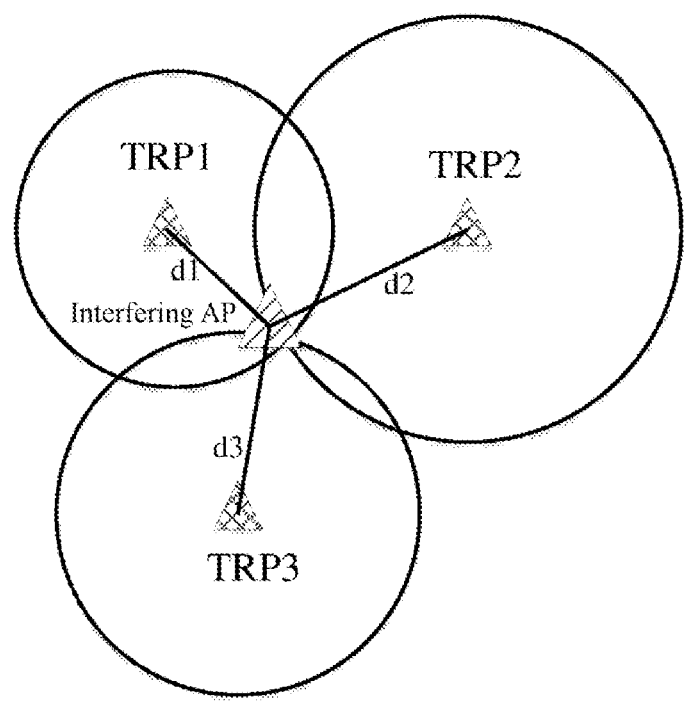
FIG. 4 is a schematic diagram showing an example of determining position information of an interfering point according to a three-point positioning method.

On the other hand, if the number of the second base stations in the first set is larger than or equal to 3, then according to the principle of "three-point positioning method", the determining unit 306 may determine, the position information of an interfering point based on position information and results of clear channel assessment of three second base stations, magnitudes of the results of clear channel assessment of which are largest, in the first set. Details regarding how to determine the position information of the interfering point according to the three-point positioning method are described below in conjunction with FIG. 4. FIG. 4 is a schematic diagram showing an example of determining position information of an interfering point according to a three-point positioning method.

As shown in FIG. 4, it is assumed that TRP1, TRP2 and TRP 3 are the three second base stations, magnitudes of the results of clear channel assessment of which are largest, in the first set. Since there is a certain mapping relationship between a result of clear channel assessment (that is, a level of received power) and a transmission distance of an electromagnetic wave (that is, a distance between the second base station and the interfering point), which involves not only path loss of the electromagnetic wave, but also fading and shadowing effect of the electromagnetic wave, a distances between each of the second base stations TRP1, TRP2 and TRP3 and the interfering point may be determined as d1, d2 and d3 based on results of clear channel assessment of TRP1, TRP2 and TRP3. In this way, based on the position information of TRP1, TRP2 and TRP3 and the distances d1, d2 and d3 between each of TRP1, TRP2 and TRP3 and the interfering point, the position of interfering AP may be uniquely determined according to the three-point positioning method.

After determining the position of the interfering AP, the determining unit 306 may further determine, according to geometrical relationship between the position information of the second base stations and the position information of the interfering point and the user equipment, second base stations the geometrical relationship of each of which satisfies a predetermined condition, among the first number of second base stations, to access to the unlicensed band.

Figure 5:
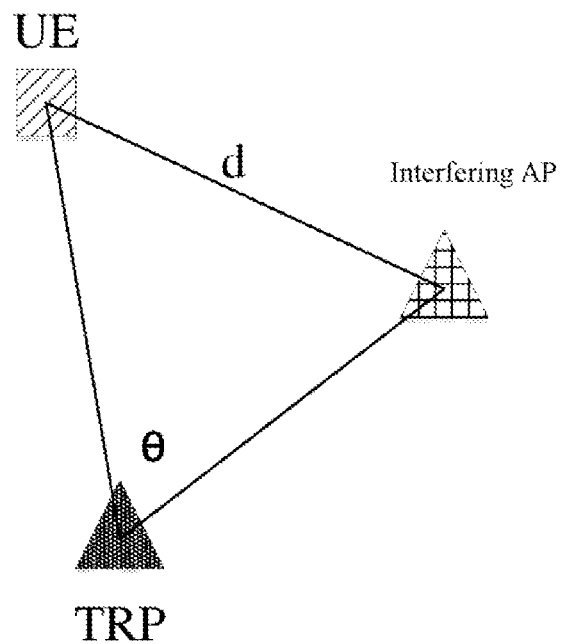
FIG. 5 is a schematic diagram showing an example of determining whether a second base station may access to an unlicensed band based on a geometrical relationship between a user equipment, the second base station and a interfering point.

Preferably, the predetermined condition to be satisfied by the geometrical relationship is that each of a distance between the user equipment and the interfering point and an angle of a transmission beam from the second base station to the user equipment which deviates from the interfering point is larger than a predetermined threshold. An example of how to determine whether the second base station may access to the unlicensed band based on the geometrical relationship between the user equipment, the second base station and the interfering point is described in detail below in conjunction with FIG. 5. FIG. 5 is a schematic diagram showing an example of determining whether a second base station may access to an unlicensed band based on a geometrical relationship between the user equipment, the second base station and a interfering point.

As shown in FIG. 5, the position information of each node may be represented by the Cartesian coordinate system. TRP represents each second base station of the first number of second base stations (for example, n second base stations); d represents a distance between the user equipment UE and the interfering AP, which may be calculated based on position information reported by the user equipment in real time and the position information of the interfering AP determined as described above; and θ represents an angle of a transmission beam from the TRP to the user equipment UE which deviates from the interfering AP. Thus, if the relationship $f(d,\theta) > (d_T, \theta_T)$ is satisfied, that is, d>dT and θ>θT, then it is determined that the TRP may access to the unlicensed band to provide service for the user equipment. On the contrary, if either one of d and θ is smaller than the corresponding threshold, it is determined that the TRP may not access to the unlicensed band. The n second base stations are traversed in sequence, so that for each of the n second base stations, the geometrical relationship between the second base station and the user equipment and the interfering AP is determined.

Preferably, the number of the second base stations, the geometrical relationship of each of which satisfies the predetermined condition and each of which is determined to access to the unlicensed band to provide service for the user equipment, may also be limited to the predetermined second number (for example, m). In this way, all the second base stations which are determined to access to the unlicensed band may constitute a coordinated transmission set, to provide downlink data service for the user equipment by performing coordinated multi-point transmission.

Referring back to FIG. 3, after the determining unit 306 determines the second base stations which may access to the unlicensed band, the notifying unit 308 may notify a determination result to each of second base stations, and then of the corresponding second base stations may complete access to the unlicensed band based on the determination result, to provide downlink data service for the user equipment.

Preferably, as described above, when it is determined that multiple second base stations may coordinate to provide downlink data service for the user equipment, the notifying unit 308 may also notify control information related to coordinated multi-point transmission to each of second base stations, so as to control the multiple second base stations to provide service for the user equipment together.

Figure 6:
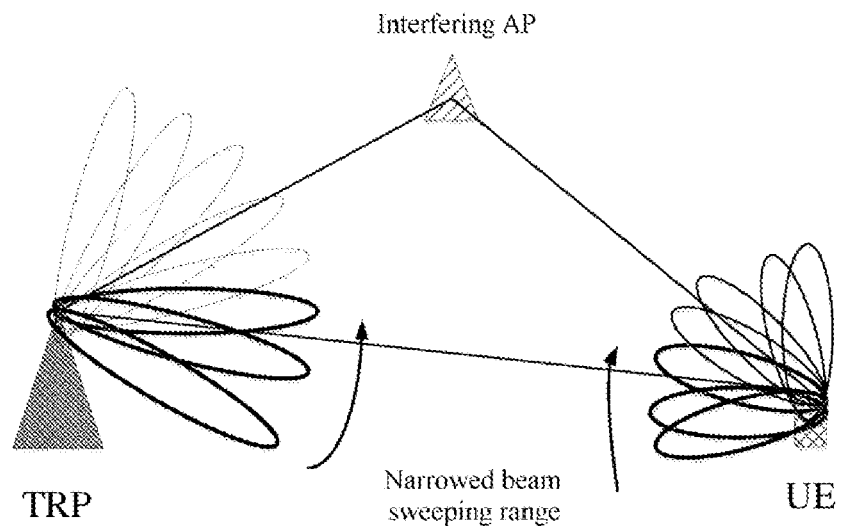
FIG. 6 is a schematic diagram showing an example of performing beam sweeping in a narrowed beam sweeping range based on position information of an interfering point according to an embodiment of the present disclosure.

Furthermore, as a preferred example, the determining unit 306 may further determine a beam sweeping range based on the position information of the interfering point determined as described above, and the notifying unit 308 may notify the determined beam sweeping range to the second base stations which are determined to access to the unlicensed band and the user equipment, so that these second base stations and the user equipment perform transmission/reception beam sweeping based on received information of the beam sweeping range. An example of performing beam sweeping in a narrowed beam sweeping range based on position information of an interfering point is described in detail with reference to FIG. 6. FIG. 6 is a schematic diagram showing an example of performing beam sweeping in a narrowed beam sweeping range based on position information of an interfering point according to an embodiment of the present disclosure.

After the position of the interfering AP is determined, in order to avoid interference with the AP, a beam sweeping range of a second base station (for example, TRP) is narrowed correspondingly. As shown in FIG. 6, transmission beams in the original beam sweeping range represented by dashed lines may cause interference to an AP, and therefore the beams in the range represented by dashed lines are excluded. In this way, interference to the AP may be automatically avoided, and the AP is not affected even if it is working. Therefore, the TRP and the UE may perform beam sweeping in the narrowed beam sweeping range represented by solid lines so as to determine the optimal transmission/reception beam for each other, thereby increasing beam sweeping speed and reducing power consumption for beam sweeping.

An example of a case in which centralized scheduling is performed by the first station is described above in conjunction with FIGS. 3 to 6. An example in which second base stations determine access to an unlicensed band by themselves in a case of distributed scheduling is described below.

1-2. Second Example (in a Case of Distributed Scheduling)

Figure 7:
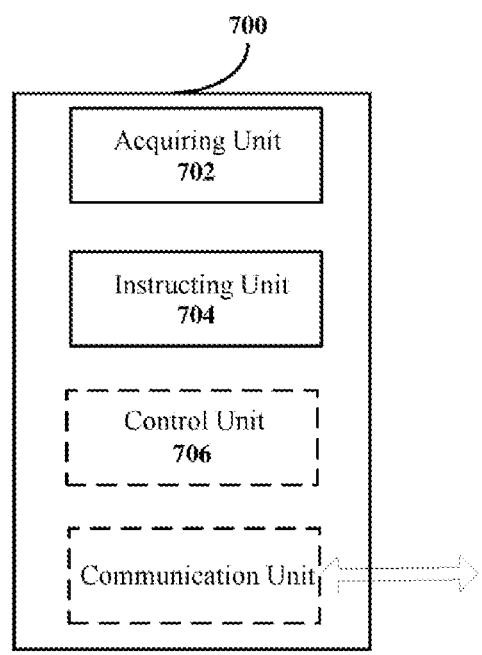
FIG. 7 is a block diagram showing yet another functional configuration example of a device in a wireless communication system according to the first embodiment of the present disclosure.

FIG. 7 is a block diagram showing yet another functional configuration example of a device in a wireless communication system according to the first embodiment of the present disclosure.

As shown in FIG. 7, a device 700 according to this example may include an acquiring unit 702 and an instructing unit 704. The functional configuration example of the acquiring unit 702 is the same as that of the acquiring unit 202 described above with reference to FIG. 2, which is not repeated herein. Only the functional configuration example of the instructing unit 704 is described in detail below.

The instructing unit 704 may be configured to instruct the first number of second base stations (n second base stations) to perform beamforming-based clear channel assessment, so that the first number of second base stations respectively determine access to an unlicensed band by themselves based on results of clear channel assessment as the information about the result of clear channel assessment. Subsequently, the process of the second base station estimating a position of an interfering point based on the beamforming-based CCA and then determining whether it may access to the unlicensed band is described in detail in the description of a configuration example of the second base station.

Preferably, the device 700 may further include a control unit 706 (which is optional and is indicated by a dashed box). The control unit 706 may be configured to control, based on reporting results from the second base stations determined to be able to access to the unlicensed band, the second base stations determined to be able to access to the unlicensed band to perform coordinated multi-point transmission with respect to the user equipment.

In a case where coordinated multi-point transmission is supported, each second base station, after determining to be able to access to the unlicensed band by itself, may not directly access to the unlicensed band to provide service for the user equipment. Rather, the second base stations should report the first base station of results determined by them, and then the first base station performs coordination control on these second base stations, so that these multiple second base stations provide data service for the user equipment by performing coordinated multi-point transmission on the unlicensed band. Specific process regarding how to perform coordination control and resource allocation to implement coordinated multi-point transmission may be performed according to the existing technology or according to other technology that may emerge in the future, which are not discussed in the present disclosure.

Preferably, the instructing unit of each of the above devices 200, 300 and 700 may be further configured to dynamically update, based on at least one of variation in the position information of the user equipment and variation in environmental information, an instruction for the one or more second base stations to perform clear channel assessment for the unlicensed band. The reason for the updating is as follows. The user equipment is in motion, and when the position information of the user equipment varies greatly, information of both the around second base station which may provide service to the user equipment and the around interfering point may change. Therefore, it is desirable for the first base station to re-determine a set of the second base stations that need to perform clear channel assessment, so that the second base stations which may access to the unlicensed band can be determined by the first base station or the second base station. On the other hand, since the second base station needs to share the unlicensed band with other nodes, the above updating operation also needs to be performed when environment information such as a network condition changes.

Figure 8:
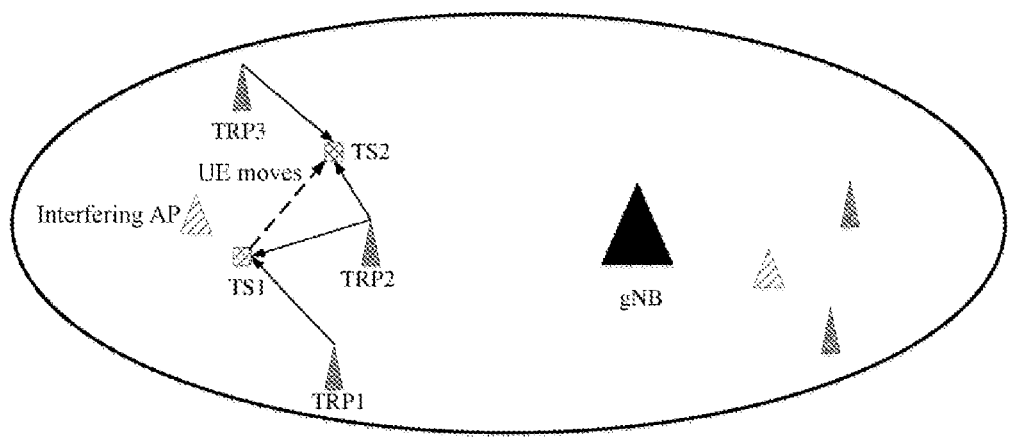
FIG. 8 is a schematic diagram showing a scenario example in which a user equipment moves according to an embodiment of the present disclosure.

FIG. 8 is a schematic diagram showing a scenario example in which a user equipment moves according to an embodiment of the present disclosure. As shown in FIG. 8, when the user equipment moves to position TS2 from current position TS1, the distributions of the second base stations and the interfering points around the user equipment both change. Therefore, it is desirable to re-determine a second base station that may provide downlink data service for the user equipment on the unlicensed band for position TS2. Therefore, it is desirable to perform the above operations of determining the n second base stations, determining the coordinated measurement set, determining the interfering point, and determining the coordinated transmission set, and the like. For example, in the example shown in FIG. 8, for position TS1, second base stations providing downlink data service for the user equipment may include TRP1 and TRP2, and for position TS2, second base stations providing downlink data service for the user equipment are updated to include TRP2 and TRP3.

It should be noted that, the above devices 200, 300, and 700 at the first base station side may be implemented at a chip level, or may be implemented at a device level by including other peripheral components. For example, each of the above devices may also operate as the first base station itself, and include a communication unit for performing communication operation. For example, the communication unit may be configured to perform communication with the user equipment and communication with the second base station, and perform data forwarding between the second base station and the user equipment before the second base station accesses to the unlicensed band and establishes data connection with the user equipment.

The configuration examples of devices at the first base station side in cases of centralized scheduling and distributed scheduling are described above. It can be seen that, in a case of centralized scheduling, the first base station obtains the information of the whole network and thus performs scheduling more convenient and efficient, but a calculation process at the first base station side is relatively complex. In a case of distributed scheduling, calculation load of the first base station is reduced, but the first base station is still required to perform global coordination. Corresponding to the configuration example on the first base station side, a configuration example on the second base station side is described in detail below.

2. Configuration Example on a Second Base Station Side According to the Present Disclosure (Second Embodiment)

Figure 9:
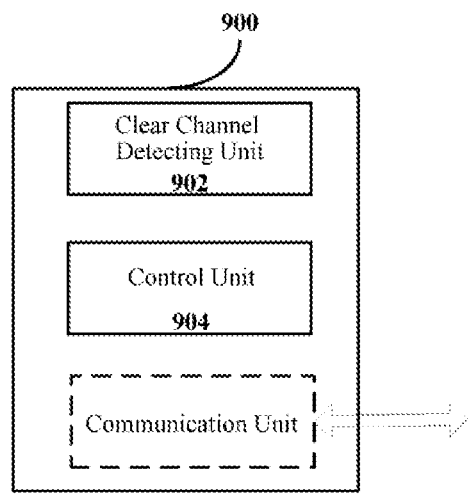
FIG. 9 is a block diagram showing a functional configuration example of a device in a wireless communication system according to a second embodiment of the present disclosure.

FIG. 9 is a block diagram showing a functional configuration example of a device in a wireless communication system according to a second embodiment of the present disclosure. The device may be arranged on the second base station side.

As shown in FIG. 9, a device 900 according to this embodiment may include a clear channel detecting unit 902 and a control unit 904. Functional configuration example of each unit is described in detail below.

The clear channel detecting unit 902 may be configured to perform clear channel assessment for an unlicensed band, according to an instruction made by a first base station based on position information of the one or more second base stations and position information of a user equipment.

Preferably, the second base station in which the device 900 is located is contained in a first number of second base stations, which are selected, by the first base station, from the one or more second base stations based on a distance between each second base station and the user equipment. As described above, as a preferred example, the first base station may select, from the multiple second base stations in its coverage range, n base stations that are closest to the user equipment, and instruct the n base stations to perform clear channel assessment for the unlicensed band. Results of clear channel assessment of the n second base stations may be subsequently used to determine, in a centralized scheduling manner or a distributed scheduling manner, the second base station which may access to the unlicensed band to provide service for the user equipment.

The control unit 904 may be configured to control, based on information about a result of clear channel assessment, access to the unlicensed band of a second base station in which the device 900 is located. As described above, in a case of the centralized scheduling, the information about a result of clear channel assessment may be an instruction from the first base station about a determination result regarding whether the second base station in which the device 900 is located may access to the unlicensed band; alternatively, in a case of the distributed scheduling, the information about a result of clear channel assessment may be a result of clear channel assessment obtained by the clear channel detecting unit 902 of the device 900, so that the device 900 determines whether it is able to access to the unlicensed band by itself. The configuration examples in a case of centralized scheduling and in a case of distributed scheduling are respectfully described in detail in the following description.

2-1. First Example (in a Case of Centralized Scheduling)

Figure 10:
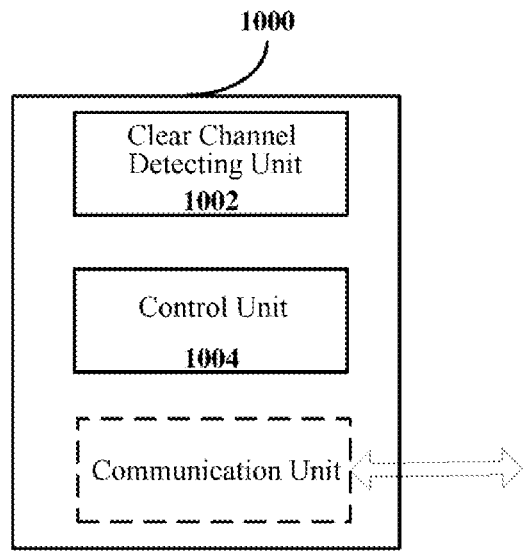
FIG. 10 is a block diagram showing another functional configuration example of the device in a wireless communication system according to the second embodiment of the present disclosure.

FIG. 10 is a block diagram showing another functional configuration example of a device in a wireless communication system according to the second embodiment of the present disclosure. The example corresponds to the case of centralized scheduling.

As shown in FIG. 10, a device 1000 according to this example may include a clear channel detecting unit 1002 and a control unit 1004.

The clear channel detecting unit 1002 may be configured to perform, according to an instruction from a first base station, omni-directional clear channel assessment for an unlicensed band so as to perform joint perception for the unlicensed band together with other second base stations, and report a result of clear channel assessment to the first base station.

Since in a case of centralized scheduling, it is desirable to centrally determine, by the first base station, whether each second base station may access to the unlicensed band, all of the second base stations instructed to perform clear channel assessment need to report their results of clear channel assessment (for example, received powers) to the first base station.

After the first base station determines, as described above with reference to FIGS. 4 and 5, based on the reporting result of each second base station, whether there is an interfering point (for example, interfering AP) and position information of the interfering point, and then determines, based on the geometrical relationship between the interfering point, the second base station and the user equipment, the second base station which may access to the unlicensed band, the first base station instructs the second base station, so that the control unit 1004 of the device 1000 at the second base station side may control access to the unlicensed band of the second base station in which the device 1000 is located based on the instruction from the first base station.

Furthermore, preferably, the first base station may further notify, to the second base station, the narrowed beam sweeping range determined based on the position information of the interfering point, so that the control unit 1004 of the device 1000 at the second base station side may also control, based on the narrowed beam sweeping range notified by the first base station, the second base station in which the device 1000 is located to perform transmission beam sweeping with respect to the user equipment. Specifically, as described above with reference to FIG. 6, the transmission beam of the second base station should avoid the position of the interfering point to prevent interference to the interfering point, so that the second base station may perform transmission beam sweeping with respect to the user equipment within the narrowed beam sweeping range (the beam sweeping range represented by solid lines). In this way, beam sweeping speed may be increased, and power consumption may be reduced. The determination of the position information of the interfering point may be referred to the above description in conjunction with FIG. 4, which is not repeated herein.

In the above example of centralized scheduling, the second base station needs to perform omni-directional clear channel assessment, while the determination of the interfering point and the determination of channel access are performed by the first base station. Therefore, the processing load of the second base station, which is relatively weak in processing capability as compared with the first base station, is reduced. Furthermore, since the first base station obtains the equipment information in the whole network (including the information related to the second base station, user equipment and the like), this scheduling manner is also convenient, which reduces signaling interaction to a certain extent.

2-2. Second Example (in a Case of Distributed Scheduling)

Figure 11:
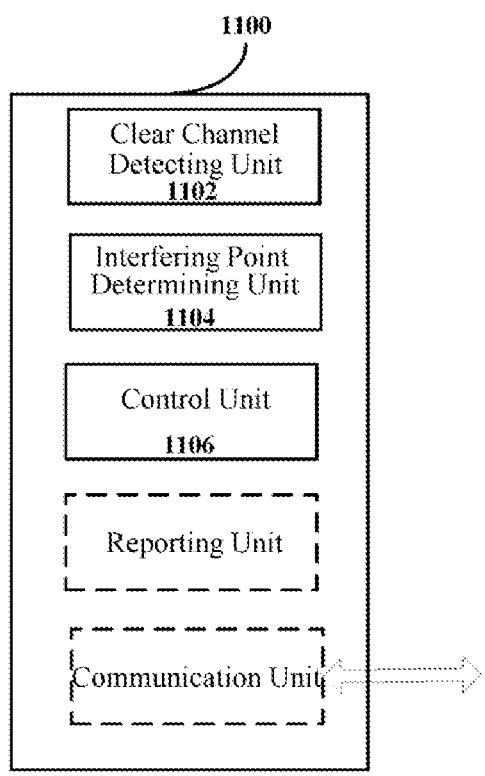
FIG. 11 is a block diagram showing yet another functional configuration example of a device in a wireless communication system according to the second embodiment of the present disclosure.

FIG. 11 is a block diagram showing yet another functional configuration example of a device in a wireless communication system according to the second embodiment of the present disclosure. The example corresponds to the case of distributed scheduling.

As shown in FIG. 11, a device 1100 according to this example may include a clear channel detecting unit 1102, an interfering point determining unit 1104 and a control unit 1106. A functional configuration example of each unit is described below.

The clear channel detecting unit 1102 may be configured to perform beamforming-based clear channel assessment according to an instruction from a base station.

This example differs from the example in a case of centralized scheduling in that, in this example, a second base station (for example, TRP) operates in a beamforming mode, and thus each second base station may directly determine a distance and an azimuth angle between the second base station and an interfering point based on a measurement result of beamforming-based CCA, so that the second base station may determine the position information of the interfering point further based on the position information of the second base station.

The interfering point determining unit 1104 may be configured to determine position information of the interfering point based on a result of clear channel assessment.

Figure 12:
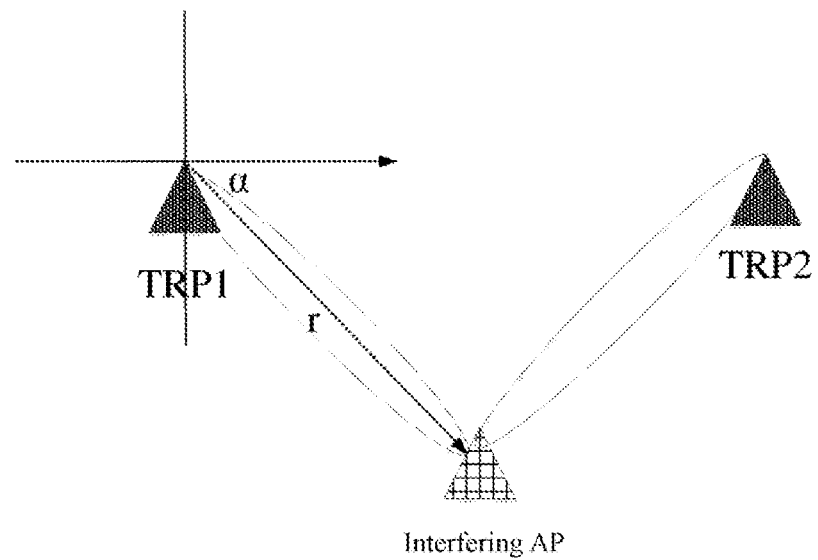
FIG. 12 is a schematic diagram showing an example of determining a position of an interfering point based on a result of beamforming-based clear channel assessment.

An example regarding how to determine a position of the interfering point based on the result of beamforming-based clear channel assessment is described in detail below with reference to FIG. 12. FIG. 12 is a schematic diagram showing an example of determining a position of an interfering point based on a result of beamforming-based clear channel assessment. In this example, position coordinates are represented by the Cartesian coordinate system.

As shown in FIG. 12, based on the measurement result of beamforming-based CCA in combination with a mapping relationship between the measurement result of CCA and a distance, the second base station TRP1 determines a distance r and an azimuth angle α between the TRP1 and the interfering AP, so that the second base station TRP1 may determine the position of the interfering AP further based on the position information of the second base station TRP1. Similarly, the second base station TRP2 may also determine the position of interfering AP in the above manner.

The control unit 1106 may be configured to control, based on geometrical relationship between position information of the second base station in which the device 1100 is located and the position information of the interfering point and position information of the user equipment, access to the unlicensed band of the second base station in which the device 1100 is located. It should be noted that, since a data connection is not yet established between the second base station and the user equipment at this stage, the user equipment needs to report its real-time position information to the first base station, by which the real-time position information is forwarded to the second base station.

After the position of the interfering AP is determined, the control unit 1106 of the device 1100 at the second base station side may determine whether the geometrical relationship between its position and the interfering point and the user equipment satisfies a predetermined condition (that is, $f(d,\theta) > (d_T, \theta_T)$) according to the manner described above with reference to FIG. 6; and it may determine the second base station in which the device 1100 is located may access to the unlicensed band in a case of judging that the geometrical relationship satisfies the predetermined condition.

Preferably, after determining that the second base station in which the device 1100 is located may access to the unlicensed band according to the above geometrical relationship, the control unit 1106 may also determine an optimal transmission beam for providing service for the user equipment according to the geometrical relationship, so as to provide better service for the user equipment while avoiding interference to the interfering point.

On the other hand, if the interfering point determining unit 1104 determines that there is no interfering point based on the result of clear channel assessment, the control unit 1106 may directly determine that the second base station in which the device 1100 is located may access to the unlicensed band without the above judging regarding the geometrical relationship.

Preferably, as described above, in order to provide seamless connectivity and more smooth service for user equipment when the user equipment moves, the technology according to the present disclosure also supports coordinated multi-point transmission on the unlicensed band. Therefore, after each of multiple second base stations respectively determines that it may access to the unlicensed band by itself as described above, these second base stations further need to report the determination results to the first base station, so that the first base station may determine, based on the determination results in combination with the actual situation of the whole network, which of these second base stations may actually access to the unlicensed band and coordinate with each other to provide better service for the user equipment. That is, in a case of distributed scheduling, the device 1100 may further include a reporting unit (which is optional and is indicated by a dashed box) to report the first base station of its determination result regarding access to the unlicensed band, for the first base station to control coordinated multi-point transmission with respect to the user equipment. On the other hand, in a case of centralized scheduling, since the determination result regarding whether the second base station may access to the unlicensed band is made by the first base station, the device 1000 may be provided with no reporting unit.

Furthermore, preferably, in a case where coordinated multi-point transmission is supported, the control unit of the above device 900, 1000 or 1100 may be further configured to control, based on an instruction from the first base station, the second base station in which the device is located to perform, together with other second base stations, coordinated multi-point transmission with respect to the user equipment.

In addition, when the first base station issues an update instruction based on variation in the position information of the user equipment and/or variation in the environment information, that is, when the first base station updates the instruction regarding the second base stations which need to perform clear channel assessment, the clear channel detecting unit of the device 900, 1000 or 1100 at the second base station side which has received the instruction needs to perform clear channel assessment again. Subsequent operations performed based on the result of clear channel assessment are same as those described above, which are not repeated herein.

The scenario of a single user is described in the above embodiment. When there are multiple user equipment, especially when multiple user equipments are close to each other, even located within the same service beam range of the second base station, the device at the second base station side may provide service for the multiple user equipments by way of resource multiplexing, so as to avoid interference.

Therefore, when the second base station in which the device 900, 1000 or 1100 is located is determined to be able to access to the unlicensed band, the control unit of the device may further control, the second base station in which the device is located to provide downlink data service for the user equipment and other user equipment, which are close to each other, on the unlicensed band in a time division multiplexing manner or a frequency division multiplexing manner. Furthermore, preferably, in a case of the frequency division multiplexing manner, the control unit may further allocate frequency resources on the unlicensed band to the user equipment and other user equipment according to levels of downlink data services for the user equipment and other equipment.

It should be noted that the configuration example on the second base station side described herein corresponds to the configuration example on the first base station side described above. Therefore, the contents which are not described in detail herein may be referred to the corresponding description above, which are not repeated herein.

It should be noted that the device 900, 1000 or 1100 at the second base station side may be implemented at a chip level, or may be implemented at a device level by including other peripheral components. For example, the device may also operate as the second base station itself, and include a communication unit for performing communication operation. For example, the communication unit may be configured to perform communication with the second base station, and communication with the user equipment after the second base station establishes a connection with the user equipment, and the like.

3. Configuration Example on the User Equipment Side According to the Present Disclosure (Third Embodiment)

Figure 13:
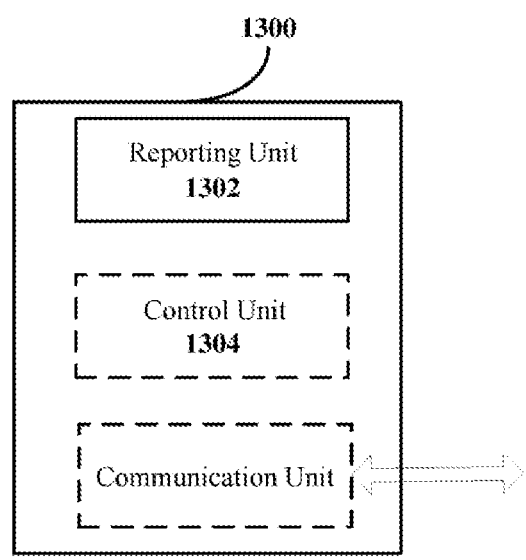
FIG. 13 is a block diagram showing a functional configuration example of a device in a wireless communication system according to a third embodiment of the present disclosure.

Corresponding to the configuration examples on the first base station side and second base stations side described above, a configuration example on the user equipment side is described below. FIG. 13 is a block diagram showing a functional configuration example of a device in a wireless communication system according to a third embodiment of the disclosure. The device may be arranged on an user equipment side.

As shown in FIG. 13, a device 1300 according to the embodiment may include a reporting unit 1302. The reporting unit 1302 may be configured to report, according to an instruction from a first base station, position information of a user equipment to the first base station in real time. Thus, based on position information of one or more second base stations and the position information of the user equipment, the first base station may instruct the one or more second base stations to perform clear channel assessment for an unlicensed band, so that the one or more second base stations control access to the unlicensed band based on information about a result of clear channel assessment. The position information of the user equipment may also be used by the first base station or the second base station to determine geometrical information between positions of each second base stations, an interfering point and the user equipment, so as to determine whether each second base station may access to the unlicensed band to provide service for the user equipment.

On the other hand, since the user equipment may be in motion, in order to ensure that the user equipment may always obtain a service of a relatively good quality, the first base station or second base station needs to dynamically update serving base stations which provide service for the user equipment. Therefore, preferably, the reporting unit 1302 may be further configured to actively report, when variation in the position information of the user equipment exceeds a predetermined threshold, current position information of the user equipment to the first base station, for the first base station to update an instruction for the one or more second base stations to perform clear channel assessment for the unlicensed band.

Furthermore, preferably, the device 1300 may further include a control unit 1304 (which is optional and is indicated by a dashed box). The control unit 1304 may be configured to: control, based on a beam sweeping range notified from the first base station and information related to a second base station determined to access to the unlicensed band, the user equipment to perform reception beam sweeping with respect to the second base station determined to access to the unlicensed band. The beam sweeping range is determined based on position information of the interfering point. The position information of the interfering point and information related to the second base station determined to access to the unlicensed band may be determined by the first base station or second base station in the above manner, and when the above information is determined by the second base station, since a communication connection is not yet established between the second base station and the user equipment in this case, it is desirable to relay the information by the first base station. As described above with reference to FIG. 6, after determining the position of the interfering point, both the second base station which provides service for the user equipment and the user equipment may perform transmission/reception beam sweeping for each other within a narrowed beam sweeping range, to determine the optimal transmission/reception beam pairs. It should be noted that, in a case of distributed scheduling, the position information of the interfering point is determined by the second base station. However, the beam sweeping range may be determined by the first base station and notified to the user equipment. Therefore, the second base station may further report the determined position information of the interfering point to the first base station, so that the first base station determines, based on the position information of the interfering point, the narrowed beam sweeping range.

It should be noted that the configuration example on the user equipment side described herein corresponds to the configuration examples on the first base station side and second base stations side described above. Therefore, the contents which are not described in detail herein can be referred to the corresponding description above, which are not repeated herein.

It should be noted that the above device 1300 at the user equipment side may be implemented at a chip level, or may be implemented at a device level by including other peripheral components. For example, the device may also operate as the user equipment itself, and include a communication unit (which is optional and is indicated by a dashed box) for performing communication operation. For example, the communication unit may be configured to perform communication with the first base station, and communication with the second base station after the user equipment establishes a connection with the second base station, and the like.

Furthermore, it should be further noted that, each functional unit of the devices at the first base station side and second base stations side and the user equipment side described above is only a logical module divided according to the specific functions which are implemented by each functional unit, and is not intended to limit the specific implementations. In the actual implementation, the above functional units and modules may be implemented as separated physical entities, or may be implemented by a single entity (for example, a processor (a CPU, or a DSP or the like), an integrated circuit or the like).

Furthermore, it should be further noted that, although the device embodiments of the present disclosure have been described above with reference to block diagrams shown in the drawings, these are exemplary rather than restrictive. Those skilled in the art may modify the shown functional configurations examples according to the principle of the present disclosure. For example, functional modules in various embodiments may be added, deleted, modified, combined or the like, and all of such modifications are considered to fall within the scope of the present disclosure.

In addition, it should be further noted that, although device configuration examples in various embodiments in a case of centralized scheduling and distributed scheduling are described respectively for clarity of description, it does not mean that various embodiments are mutually exclusive. In the actual implementation, various embodiments can be combined according to the principle of the present disclosure, and such combination should be considered to fall within the scope of the present disclosure.

4. Signaling Interaction Process According to an Embodiment of the Present Disclosure In order to further facilitate understanding of the solutions of the present disclosure, in combination with the configuration examples on the first base station side, the second base stations side and the user equipment side, a signaling interaction process for implementing the solutions according to the present disclosure is described below with reference to the flowcharts shown in FIGS. 14A, 14B and 15.

4-1. In a Case of Distributed Scheduling

Figure 14A:
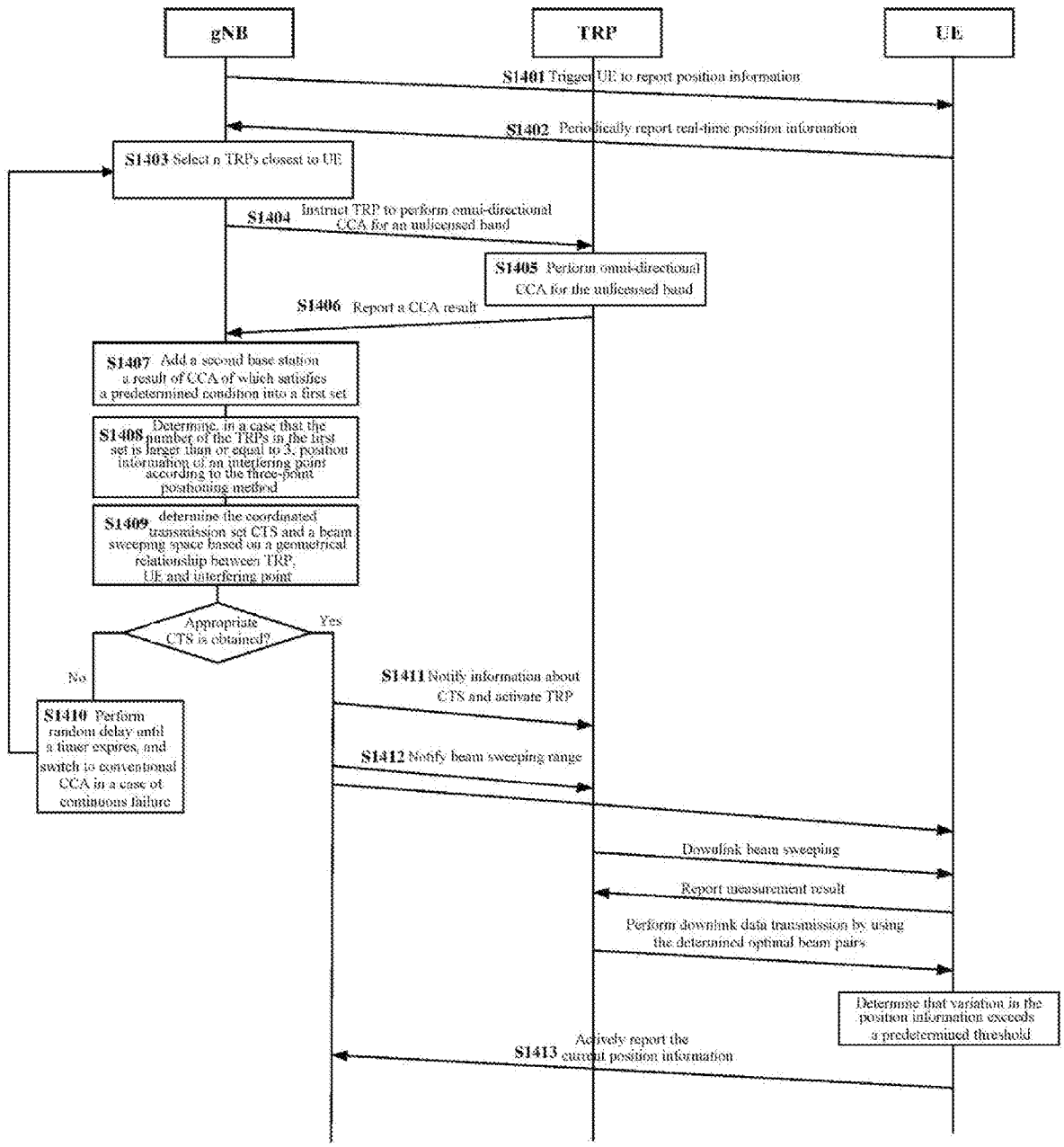
FIG. 14A is a flowchart showing an example of a signaling interaction process for performing channel access on an unlicensed band based on position information according to an embodiment of the present disclosure.

FIG. 14A is a flowchart of an example of a signaling interaction process for performing channel access on an unlicensed band based on position information according to an embodiment of the present disclosure. The example corresponds to the case of the centralized scheduling and the interfering point being determined uniquely.

As shown in FIG. 14, first, in step S1401, a first base station gNB triggers a user equipment UE to report position information, and in step S1402, the user equipment UE periodically reports real-time position information.

Next, in step S1403, the first base station gNB selects, based on the received position information of the user equipment, for example n second base stations TRPs closest to the user equipment, and in step S1404, the first base station gNB instructs the n second base stations TRPs to perform omni-directional clear channel assessment for the unlicensed band. It should be noted that, the selected n second base stations TRP closest to the user equipment are only examples and not limitations, and the n second base stations TRPs may also are, for example, the n second base stations TRP which a distance between the n second bases stations TRP and the user equipment satisfies predetermined requirements, which is not limited in the present disclosure.

Next, a second base station TRP performs, in step S1405, omni-directional CCA, and in step S1406, reports a CCA result (which may be received power or a distance between the second base station TRP and an interfering point AP determined based on a mapping relationship) to the first base station gNB.

Then, in step S1407, the first base station gNB adds a second base station a result of CCA of which satisfies a predetermined condition into a first set (that is, coordinated measurement set CMS), and next, the first base station gNB determines the second base station which may access to the unlicensed band based on different number of the second base station in the first set. Specifically, when the number of the second base stations in the first set is larger than or equal to 3, the first base station gNB determines, in step S1408, position information of the interfering point according to the three-point positioning method described above with reference to FIG. 4, and in step S1409, the first base station gNB determines, based on the geometrical relationship described above with reference to FIG. 5, the coordinated transmission set CTS constituted by the second base stations which provide service for the user equipment and a beam sweeping range.

In step S1410, if it is determined that no appropriate coordinated transmission set is obtained, random delay is performed until a timer expires, and the processing returns to step S1403. On the other hand, if it is determined that an appropriate coordinated transmission set is obtained, information related to the coordinated transmission set is notified to the second base station TRP in step S1411, and the second base station TRP is activated to access to the unlicensed band to establish communication with the user equipment. Then, in step S1412, the first base station gNB notifies the determined beam sweeping range to the second base station TRP and the user equipment UE, so that the second base station TRP and the user equipment UE may determine the optimal transmission/reception beam for each other within a narrowed beam sweeping range, and perform downlink data transmission service by using the determined optimal beam pairs.

On the other hand, in step S1413, the user equipment UE actively reports, in a case of determining that the variation in position information of the user equipment UE exceeds a predetermined threshold, the current position information of the user equipment UE to the first base station, thereby triggering that determining processes related to the n base stations, the coordinated measurement set and the coordinated transmission set above are repeatedly performed.

Figure 14B:
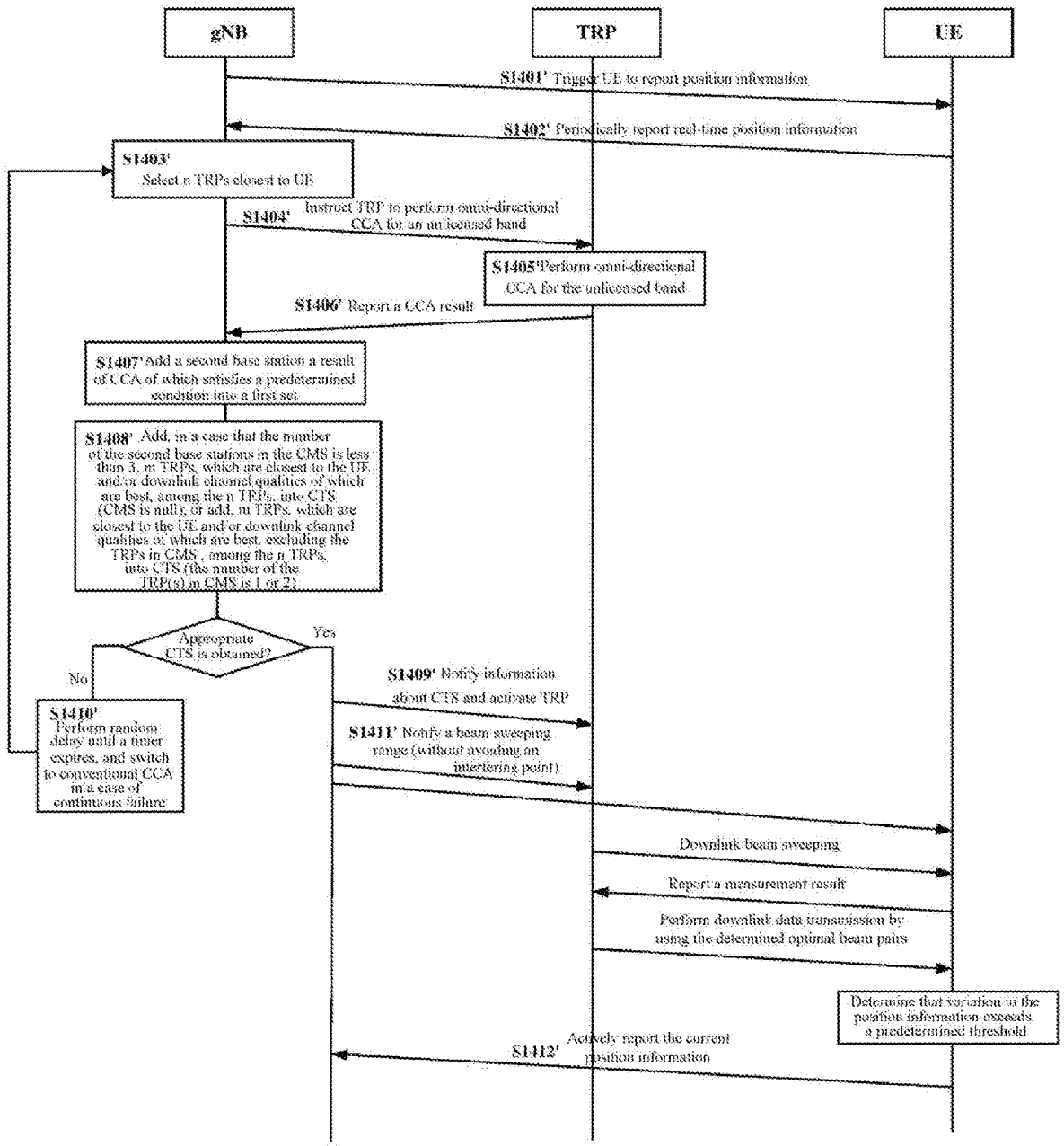
FIG. 14B is a flowchart showing another example of a signaling interaction process for performing channel access on an unlicensed band based on position information according to an embodiment of the present disclosure.

FIG. 14B is a flowchart showing another example of a signaling interaction process for performing channel access on the unlicensed band based on the position information according to an embodiment of the present disclosure. The example corresponds to the case of the centralized scheduling and the interfering point being not determined uniquely.

The signaling interaction process shown in FIG. 14B is substantially similar to that shown in FIG. 14A. The distinction lies in that: when the number of the second base station in the coordinated measurement set CMS obtained in step S1408' is less than 3 so that position of an interfering point cannot be determined uniquely, a first base station gNB directly selects, a predetermined number (for example, m) of second base stations, which are closest to the user equipment and/or downlink channel qualities of which are best, among n second base stations, as the serving base station to the user equipment (corresponding to the case that CMS is null), or determines a predetermined number (for example, m) of second base stations, which are closest to the user equipment and/or downlink channel qualities of which are best, excluding the second base stations in CMS, among the n second base stations, as the serving base station to the user equipment (corresponding to the case that the number of the second base stations in CMS is 1 or 2), that is, the above coordinated transmission set CTS is determined. Next, in step S1409', the determined information related to CTS is notified to the second base station TRP and the second base station TRP is activated. On the other hand, the distinction also lies in that: since there is no interfering point or the position of the interfering point cannot be determined, the beam sweeping range notified, by the first base station gNB, to the second base station TRP and the user equipment UE does not avoid the narrowed beam sweeping range of the interfering point as the example described in FIG. 14A. Operations in other steps are substantially the same as those in the example shown in FIG. 14A, which are not repeated herein.

It should be noted that, the signaling interaction process in a case of centralized scheduling described herein corresponds to the device embodiment in a case of centralized scheduling described above. Therefore, contents which are not described herein in detail can be referred to the corresponding description above, which are not repeated herein.

4-2. In a Case of Distributed Scheduling

Figure 15:
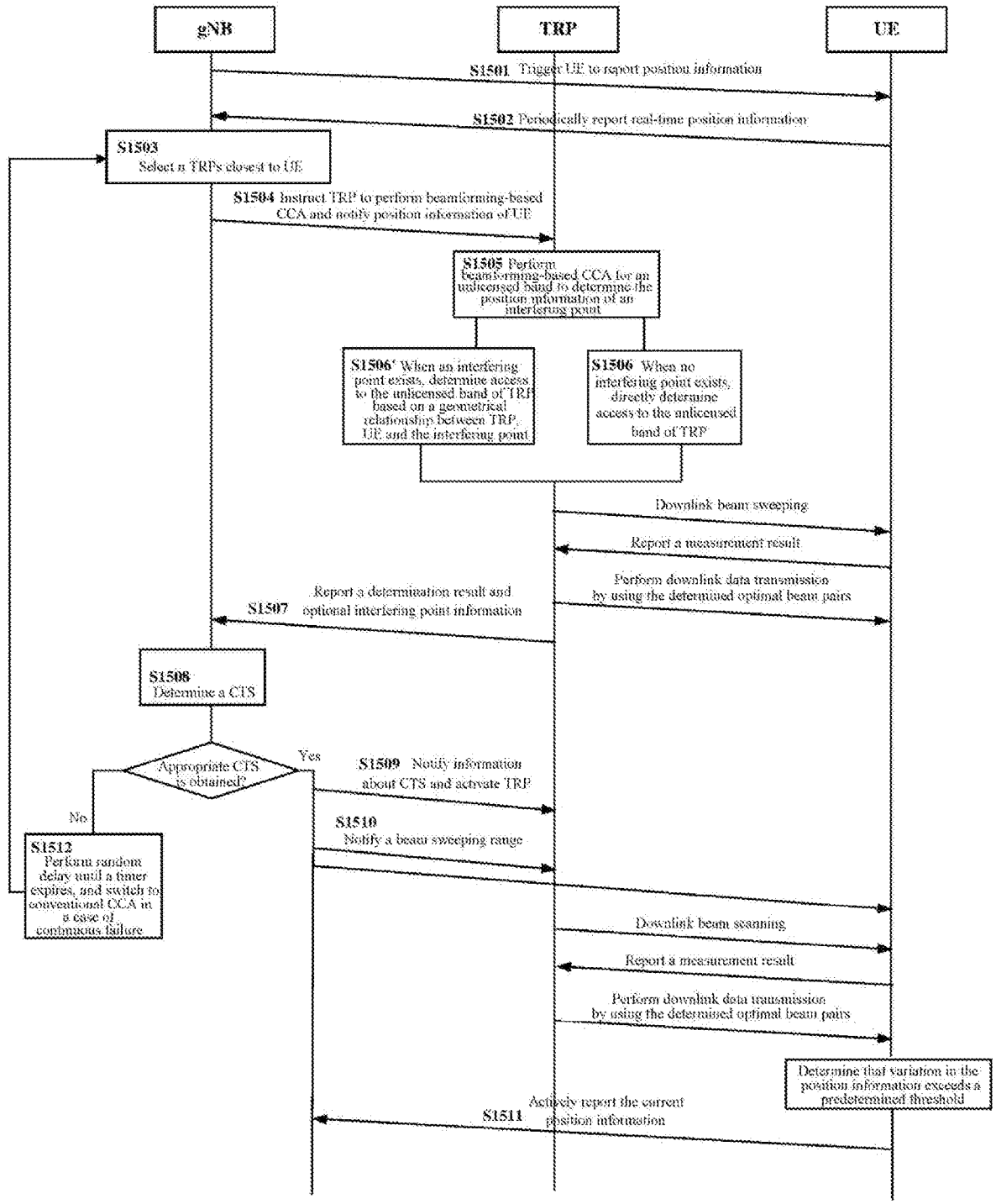
FIG. 15 is a flowchart showing yet another example of a signaling interaction process for performing channel access on an unlicensed band based on position information according to an embodiment of the present disclosure.

FIG. 15 is a flowchart showing yet another example of a signaling interaction process for performing channel access on an unlicensed band based on position information according to an embodiment of the present disclosure. The example corresponds to the case of the distributed scheduling.

In the example as shown in FIG. 15, the procedures from step S1501 to step S1503 are substantially the same as the procedures from step S1401 to step S1403 as shown in FIG. 14A, which are not repeated herein. Only the difference from the example shown in FIG. 14 is described in detail below.

In step S1504, a first base station gNB further needs to notify the received position information of a user equipment UE to a second base station TRP, in addition to instructing the second base station TRP to perform beamforming-based CCA. Next, in step S1505, the second base station TRP performs beamforming-based CCA for the unlicensed band to determine position information of an interfering point. In step S1506, when there is no interfering point, the second base station TRP directly determines access to the unlicensed band by itself. On the other hand, after determining the position information of the interfering point, in step S1506', the second base station TRP then determines whether may access to the unlicensed band by itself based on a geometrical relationship between the position information thereof and the position information of the user equipment and the position information of the interfering point. In a case of determining access to the unlicensed band, the second base station TRP and the user equipment UE may perform transmission/reception beam sweeping for each other, and perform downlink data transmission by using the determined optimal transmission/reception beam pairs.

In a case where coordinated multi-point transmission is supported, in step S1507, the second base station TRP may also report the determination result of whether the unlicensed band may be accessed and the alternative information of interfering point to the first base station gNB. In step S1508, the first base station gNB determines an appropriate coordinated transmission set, and in step S1509, notifies the information related to the coordinated transmission set to the second base station TRP and the second base station TRP is activated. In step S1510, the second base station TRP and the user equipment UE are instructed to perform transmission/reception beam sweeping within the corresponding beam sweeping range, to perform downlink data transmission by using the determined optimal beam pairs.

On the other hand, in step S1511, in a case of determining that the variation in position information of the user equipment UE exceeds the predetermined threshold, the user equipment UE actively reports the current position information thereof to the first base station gNB, thereby triggering that determining processes related to the n base stations, the interfering point and the coordinated transmission set above are repeatedly performed.

It should be noted that, the signaling interaction process in a case of the distributed scheduling described herein corresponds to the device embodiment in a case of the distributed scheduling described above. Therefore, contents which are not described herein in detail can be referred to the corresponding description above, which are not repeated herein.

It should be further noted that, the signaling interaction process described herein is only example given for explaining the principle of the present disclosure, and should not be construed as limiting the scope of the present disclosure. Those skilled in the art may appropriately modify the above signaling interaction process according to the principles of the present disclosure and in combination with the actual situation, and all of such modifications should be considered to fall within the scope of the present disclosure.

Furthermore, it should be further noted that, although the steps are numbered in time sequence for convenience of description in FIGS. 14A to 15, these numbers do not indicate the order in which the steps are performed. In practice, some steps may be performed in parallel, or the order may be exchanged with each other, and so on.

5. Method Embodiments According to the Present Disclosure

Method embodiments corresponding to the device embodiments described above are further provided in the present disclosure below.

Figure 16:
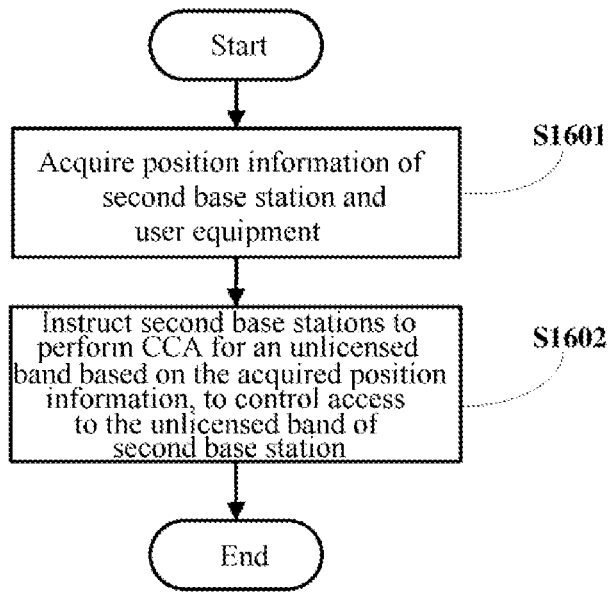
FIG. 16 is a flowchart showing a process example of a method in a wireless communication system according to the first embodiment of the present disclosure.

FIG. 16 a flowchart showing a process example of a method in a wireless communication system according to the first embodiment of the present disclosure. The method may be performed on the first base station side.

As shown in FIG. 16, the method according to the embodiment starts from step S1601. In step S1601, position information of one or more second base stations and position information of a user equipment are acquired. Preferably, the pre-stored position information may be read from a storage device or the current position information is obtained in real time.

Next, the method proceeds to step S1602. In step S1602, based on the acquired position information of the one or more second base stations and position information of the user equipment, the one or more second base stations are instructed to perform clear channel assessment for an unlicensed band, so that the one or more second base stations control access to the unlicensed band based on information about a result of clear channel assessment. Preferably, the information about a result of clear channel assessment may be an instruction made, based on the result of the clear channel assessment, by the first base station, a determination result regarding whether the second base station may access to the unlicensed band (corresponding to the case of the centralized scheduling), or may be a result of clear channel assessment measured by the second base station, for the second base station to determine whether the second base station may access to the unlicensed band by itself (corresponding to the case of the distributed scheduling).

It should be noted that, the method embodiment described herein corresponds to the above device embodiment on the first base station side. Therefore, contents which are not described herein in detail can be referred to the corresponding description above, which are not repeated herein.

Figure 17:
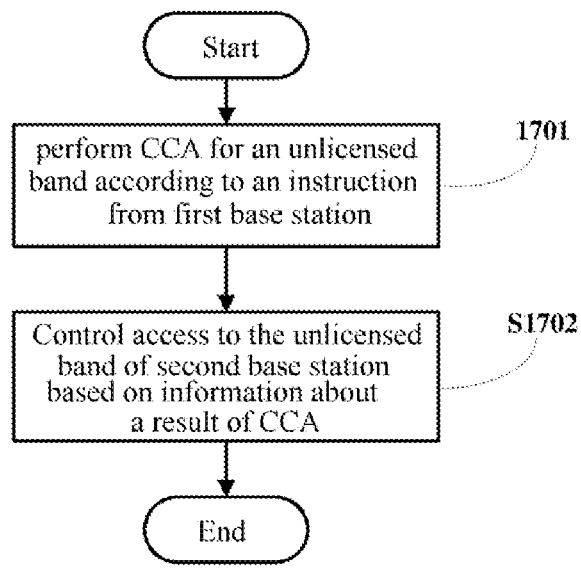
FIG. 17 is a flowchart showing a process example of a method in a wireless communication system according to the second embodiment of the present disclosure.

FIG. 17 is a flowcahrt showing a process example of a method in a wireless communication system according to the second embodiment of the present disclosure. The method may be performed on the second base station side.

As shown in FIG. 17, the method according to the embodiment starts from step S1701. In step S1701, clear channel assessment for an unlicensed band is performed according to an instruction made by the first base station based on position information of the one or more second base stations and position information of the user equipment. Specifically, the second base station may perform omni-directional CCA or beamforming-based CCA based on the instruction from the first base station.

Next, the method proceeds to step S1702. In step S1702, an access to the unlicensed band of the second base station is controlled based on information about a result of clear channel assessment. Specifically, the access to the unlicensed band of a second base station is controlled according to a determination result of whether the second base station may access to the unlicensed band made by the first base station or the second base station based on the result of clear channel assessment.

It should be noted that, the method embodiment described herein corresponds to the above device embodiment on the second base station side. Therefore, contents which are not described herein in detail can be referred to the corresponding description above, which are not repeated herein.

Figure 18:
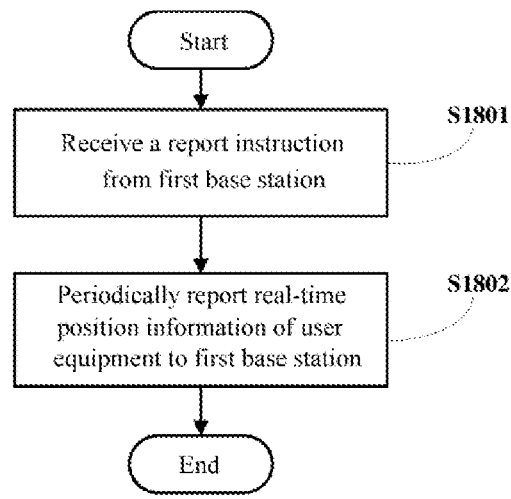
FIG. 18 is a flowchart showing a process example of a method in a wireless communication system according to the third embodiment of the present disclosure.

FIG. 18 is a flowchart showing a process example of a method in a wireless communication system according to the third embodiment of the present disclosure. The method may be performed on the user equipment side.

As shown in FIG. 18, the method according to the embodiment starts from step S1801. In step S1801, an instruction from a first base station regarding reporting position information of a user equipment is received.

Next, the method proceeds to step S1802. In step S1802, position information of the user equipment is reported to the first base station in real time, according to the instruction from the first base station, for the first base station to instruct, based on the position information of the one or more second base stations and the position information of the user equipment, the one or more second base stations to perform clear channel assessment for an unlicensed band, so that the one or more second base stations control access to the unlicensed band based on information about a result of clear channel assessment.

It should be noted that, the method embodiment described herein corresponds to the above device embodiment on the user equipment side. Therefore, contents which are not described herein in detail can be referred to the corresponding description above, which are not repeated herein.

It should be further noted that, although the processes examples of the methods in the wireless communication system according to the embodiment of the present disclosure have been described above, these are only examples rather than limitations. Those skilled in the art may modify the above embodiments according to the principle in the present disclosure. For example, the steps in the embodiments may be added, deleted and/or combined, or the like, and all of such modifications fall within the scope of the present disclosure.

According to the above embodiments of the present disclosure, channel access on the unlicensed band is determined based on position information, such that the processing load when clear channel assessment is performed with assistance of the user equipment is reduced, thereby improving the accuracy of the result of clear channel assessment and also reducing processing time, thus improving processing efficiency. Furthermore, by controlling multiple base stations to perform coordinated multi-point transmission on unlicensed band, it is possible to provide more seamless connectivity and more smooth service for the user equipment.

It should be understood that the storage medium and the machine-executable instructions in a program product according to an embodiment of the present disclosure may further be configured to perform a method corresponding to the above device embodiments. Therefore, the contents which are not described in detail herein may be referred to corresponding descriptions above, which are not repeated herein.

Accordingly, a storage medium on which the above program product storing machine executable instructions is carried is also included in the disclosure of the invention. The storage medium includes but is not limited to a floppy disk, an optical disk, a magneto-optical disk, a storage card, a memory rod and the like.

Figure 19:
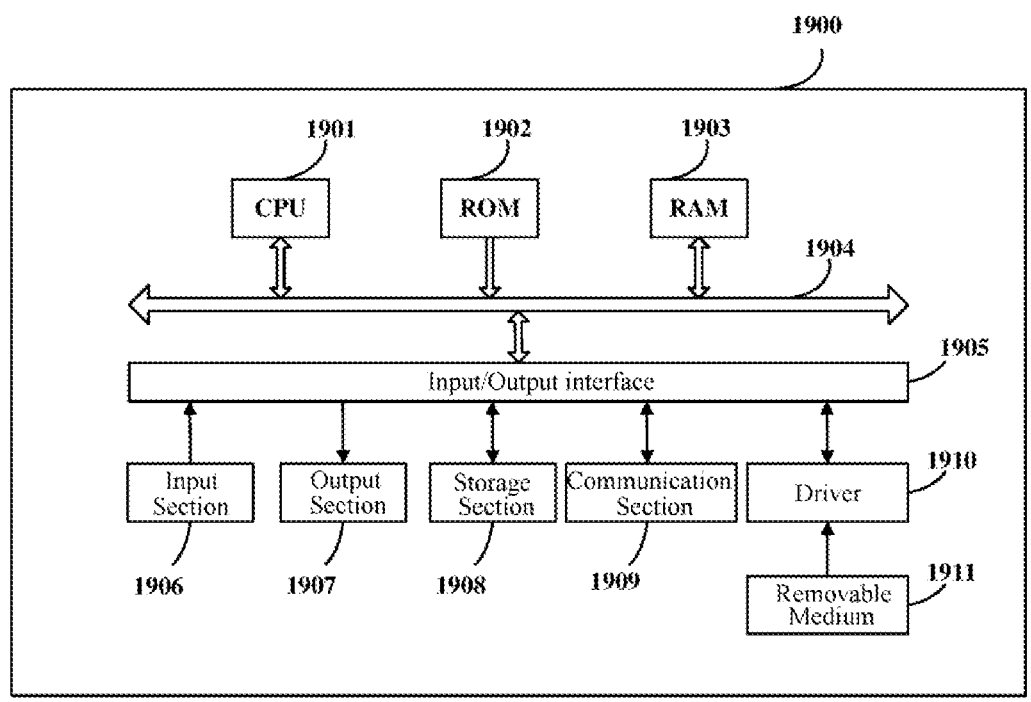
FIG. 19 is a block diagram showing an exemplary structure of a personal computer which can be used as an information processing device according to an embodiment of the present disclosure.

6. Computer Apparatus for Implementing the Device and the Method According to the Present Disclosure In addition, it should be further noted that, the above-described series of processing and device may also be implemented by software and/or firmware. In a case of being implemented in software and/or firmware, a program constituting the software is installed from a storage medium or a network to a computer with a dedicated hardware structure, e.g., a general purpose personal computer 1900 shown in FIG. 19, which can perform various functions when various programs are installed thereon. FIG. 19 is a block diagram showing an exemplary structure of a personal computer which can be used as an information processing apparatus according to an embodiment of the present disclosure.

In FIG. 19, a central processing unit (CPU) 1901 executes various processing according to the program stored in a read only memory (ROM) 1902 or the program loaded from the storage section 1908 to a random access memory (RAM) 1903. In the RAM 1903, the data required by CPU 1901 to execute various processing is also stored as needed.

The CPU 1901, the ROM 1902 and the RAM 1903 are linked with each other via a bus 1904. An input/output interface 1905 is also linked to the bus 1904.

The following components are linked to the input/output interface 1905: an input section 1906 including keyboard, mouse and the like, an output section 1907 including displays such as a cathode ray tube (CRT), a liquid crystal display (LCD), a loudspeaker and the like, a memory section 1908 including hard disc and the like, and a communication section 1909 including a network interface card such as a LAN card, modem and the like. The communication part 1909 performs communication processing via a network such as the Internet.

A driver 1910 may also be connected to the input/output interface 1905 as needed. A removable medium 1911, e.g., a magnetic disk, an optical disk, an magneto-optical disk, a semiconductor memory, etc., can be installed on the driver 1910 as needed so that a computer program fetched therefrom can be installed into the storage portion 1908 as needed.

When the foregoing series of processes are performed in software, a program constituting the software is installed from a network, such as the Internet, or a storage medium, such as the removable medium 1911, etc.

It should be understood by those skilled in the art that the memory medium is not limited to the removable medium 1911 shown in FIG. 19 in which the program is stored and which is distributed separately from the equipment so as to provide the program to the user. The removable medium 1911, for example, may include a magnetic disk (including a Floppy Disk (registered trademark)), an optical disk (including a Compact Disk Read Only Memory (CD-ROM) and a Digital Versatile Disc (DVD)), a magneto-optical disk (including a MiniDisc (MD) (registered trademark)), and a semiconductor memory. Alternatively, the storage medium may be the ROM 1902, a hard disk included in the storage section 1908, etc., which has a program stored therein and is distributed to the user along with an equipment in which they are incorporated.

7. Application Examples of the Technology According to the Present Disclosure The technology in the present disclosure can be applied into various products. For example, the base station mentioned in the present disclosure may be implemented as gNodeB (gNB), any type of evolved node B (eNB), such as a macro eNB and a small eNB, and transmission receiving point (TRP) and the like. The small eNB such as a pico eNB, a micro eNB and a home (femto-cell) eNB may have a smaller coverage range less than a macro cell. Alternatively, the base station may also be implemented as any other type of base station, such as a NodeB and a base transceiver station (BTS). The base station may include: a body configured to control wireless communication (also referred to as a base station device), and one or more remote radio heads (RRH) arranged at a position different from the position of the body. In addition, various types of user equipments, which will be described below, may each operate as the base station by temporarily or semi-persistently executing a base station function.

For example, a UE mentioned in the present disclosure may be implemented as a mobile terminal (such as a smart phone, a tablet personal computer (PC), a notebook PC, a portable game terminal, a portable/dongle type mobile router, and a digital camera device), or an in-vehicle terminal (such as a car navigation equipment). The UE may also be implemented as a terminal performing machine to machine (M2M) communication (also referred to as a machine-type communication (MTC) terminal). Furthermore, the UE may be a wireless communication module installed on each of the above terminals (such as an integrated circuit module including a single chip).

Application examples according to the present disclosure are described below with reference to FIGS. 20 to 23.

7-1. Application Example Regarding Base Station

First Application Example

Figure 20:
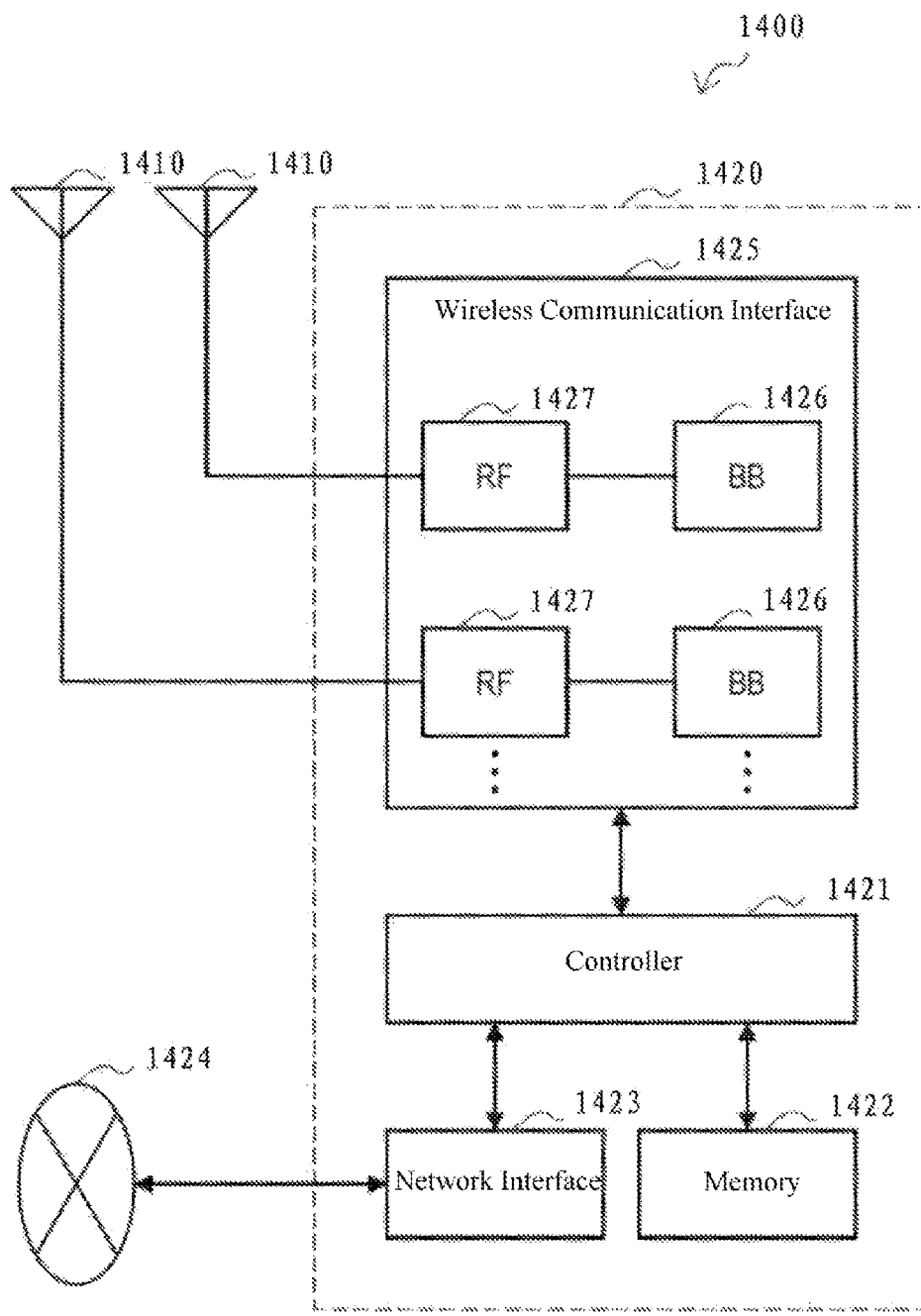
FIG. 20 is a block diagram showing a first example of a schematic configuration of an evolved node (eNB) to which the technology of the present disclosure may be applied.

FIG. 20 is a block diagram showing a first example of a schematic configuration of an eNB to which the technology according to the present disclosure may be applied. An eNB 1400 includes one or more antennas 1410 and a base station apparatus 1420. The base station apparatus 1420 and each of the antennas 1410 may be connected with each other via RF cable.

Each of the antennas 1410 includes single or more antenna elements (such as multiple antenna elements included in a multiple-input multiple-output (MIMO) antenna), and are used for transmitting and receiving a wireless signal by the base station apparatus 1420. The eNB 1400 may include the multiple antennas 1410, as shown in FIG. 20. For example, multiple antennas 1410 may be compatible with multiple frequency bands used by the eNB 1400. Although FIG. 20 shows the example in which the eNB 1400 includes multiple antennas 1410, the eNB 1400 may include a single antenna 1410.

The base station apparatus 1420 includes a controller 1421, a memory 1422, a network interface 1423, and a wireless communication interface 1425.

The controller 1421 may be a CPU or a DSP and operate various functions of higher layers of the base station apparatus 1420. For example, the controller 1421 generates a data packet based on data in a signal processed by the wireless communication interface 1425, and transfers the generated packet via a network interface 1423. The controller 1421 may bundle data from multiple baseband processors to generate bundled packet, and transfer the generated bundled packet. The controller 1421 may have logic functions for performing the following control: radio resource control, radio carrying control, mobility management, admission control and schedule. The control may be performed in conjunction with an adjacent eNB or a core network node. The memory 1422 includes a RAM and a ROM, and stores a program that is executed by the controller 1421, and various types of control data (such as a terminal list, transmission power data, and scheduling data).

The network interface 1423 is a communication interface for connecting the base station apparatus 1420 to a core network 1424. The controller 1421 may communicate with a core network node or another eNB via the network interface 1423. In that case, the eNB 1400, and the core network node or the other eNB may be connected to each other through a logical interface (such as an Si interface and an X2 interface). The network interface 1423 may also be a wired communication interface or a wireless communication interface for radio backhaul. If the network interface 1423 is a wireless communication interface, the network interface 1423 may use a higher frequency band for wireless communication than a frequency band used by the wireless communication interface 1425.

The wireless communication interface 1425 supports any cellular communication solution (such as Long Term Evolution (LTE) and LTE-Advanced, and new radio (NR)), and provides wireless connection to a terminal positioned in a cell of the eNB 1400 via the antenna 1410. The wireless communication interface 1425 may typically include for example a base band (BB) processor 1426 and an RF circuit 1427. The BB processor 1426 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 1421, the BB processor 1426 may have a part or all of the above logic functions. The BB processor 1426 may be a memory storing communication control programs or a module including a processor configured to execute programs and a related circuit. Updating programs may change functions of the BB processor 1426. The module may be a card or a blade inserted into a slot of the base station apparatus 1420. Alternatively, the module may be a chip installed on the card or the blade. In addition, the RF circuit 1427 may include for example a mixer, a filter or an amplifier, and transmits and receives a radio signal via the antenna 1410.

As shown in FIG. 20, the wireless communication interface 1425 may include multiple BB processors 1426. For example, multiple BB processors 1426 may be compatible with multiple frequency bands used by the eNB 1400. As shown in FIG. 20, the wireless communication interface 1425 may include multiple RF circuits 1427. For example, the multiple RF circuits 1427 may be compatible with multiple antenna elements. Although an example in which the wireless communication interface 1425 includes multiple BB processors 1426 and multiple RF circuits 1427 is shown in FIG. 20, the wireless communication interface 1425 may also include a single BB processor 1426 and a single RF circuit 1427.

Second Application Example

Figure 21:
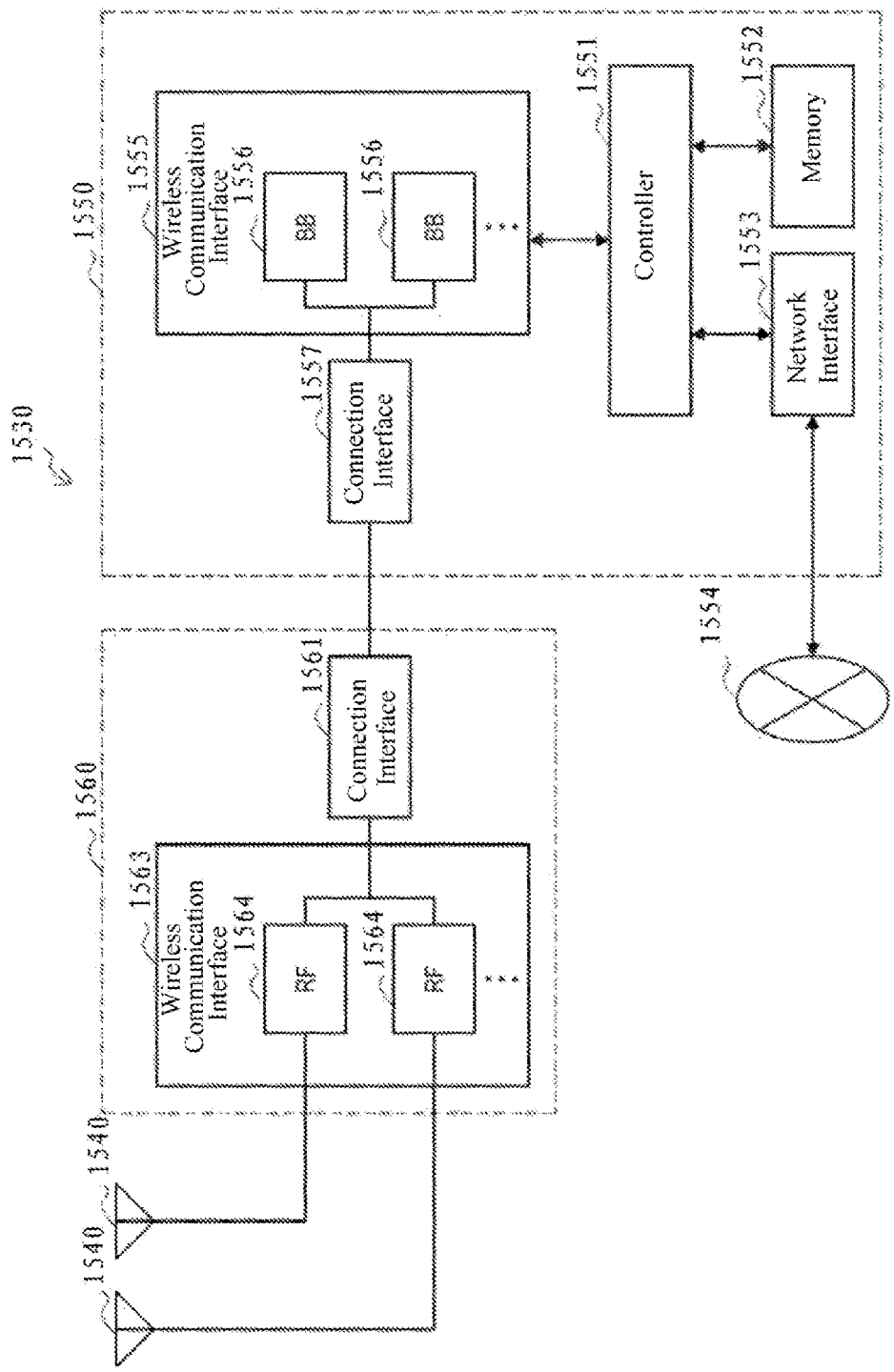
FIG. 21 is a block diagram showing a second example of a schematic configuration of the eNB to which the technology of the present disclosure may be applied.

FIG. 21 is a block diagram showing a second example of a schematic configuration of an eNB to which the technology according to the present disclosure may be applied. An eNB 1530 includes one or more antennas 1540, a base station apparatus 1550 and an RRH 1560. The RRH 1560 and each antenna 1540 may be connected with each other via an RF cable. The base station apparatus 1550 and RRH 1560 may be connected with each other via a high-speed line such as fiber cable.

Each of the antennas 1540 includes a single or multiple antenna elements (such as multiple antenna elements included in an MIMO antenna), and is used for transmitting and receiving a wireless signal by the RRH 1560. As shown in FIG. 21, the eNB 1530 may include multiple antennas 1540. For example, the multiple antennas 1540 may be compatible with multiple frequency bands used by the eNB 1530. Although FIG. 21 shows an example in which the eNB 1530 includes multiple antennas 1540, the eNB 1530 may also include a single antenna 1540.

The base station apparatus 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 20.

The wireless communication interface 1555 supports any cellular communication solution such as LTE and LTE-Advanced and NR), and provides wireless communication to a terminal positioned in a sector corresponding to the RRH 1560 via the RRH 1560 and the antenna 1540. The wireless communication interface 1555 may typically include a BB processor 1556 for example. The BB processor 1556 is the same as the BB processor 1426 described with reference to FIG. 20, except the BB processor 1556 is connected to the RF circuit 1564 of the RRH 1560 via the connection interface 1557. As show in FIG. 21, the wireless communication interface 1555 may include multiple BB processors 1556. For example, the multiple BB processors 1556 may be compatible with the multiple frequency bands used by the eNB 1530. Although FIG. 21 shows an example in which the wireless communication interface 1555 includes multiple BB processors 1556, the wireless communication interface 1555 may also include a single BB processor 1556.

The connection interface 1557 is an interface for connecting the base station apparatus 1550 (the wireless communication interface 1555) to the RRH 1560. The connection interface 1557 may also be a communication module for communication in the above described high-speed line for connecting the base station apparatus 1550 (the wireless communication interface 1555) to the RRH 1560.

The RRH 1560 includes a connection interface 1561 and a wireless communication interface 1563.

The connection interface 1561 is an interface for connecting the RRH 1560 (the wireless communication interface 1563) to the base station apparatus 1550. The connection interface 1561 may also be a communication module for the communication in the above described high-speed line.

The wireless communication interface 1563 transmits and receives a wireless signal via the antenna 1540. The wireless communication interface 1563 may typically include, for example, the RF circuit 1564. The RF circuit 1564 may include for example a mixer, a filter and an amplifier, and transmits and receives a wireless signal via the antenna 1540. The wireless communication interface 1563 may include multiple RF circuits 1564, as shown in FIG. 21. For example, the multiple RF circuits 1564 may support multiple antenna elements. Although FIG. 21 shows the example in which the wireless communication interface 1563 includes the multiple RF circuits 1564, the wireless communication interface 1563 may also include a single RF circuit 1564.

In the eNB 1400 and the eNB 1530 shown in FIG. 20 and FIG. 21, the communication unit of the device at the first base station side and second base station side described above may be implemented by the wireless communication interface 1425 and the wireless communication interface 1555 and/or the wireless communication interface 1563. At least a part of the functions of the device at the first base station side and second base station side may also be implemented by the controller 1421 and the controller 1551.

7-2. Application Example Regarding User Equipment

First Application Example

Figure 22:
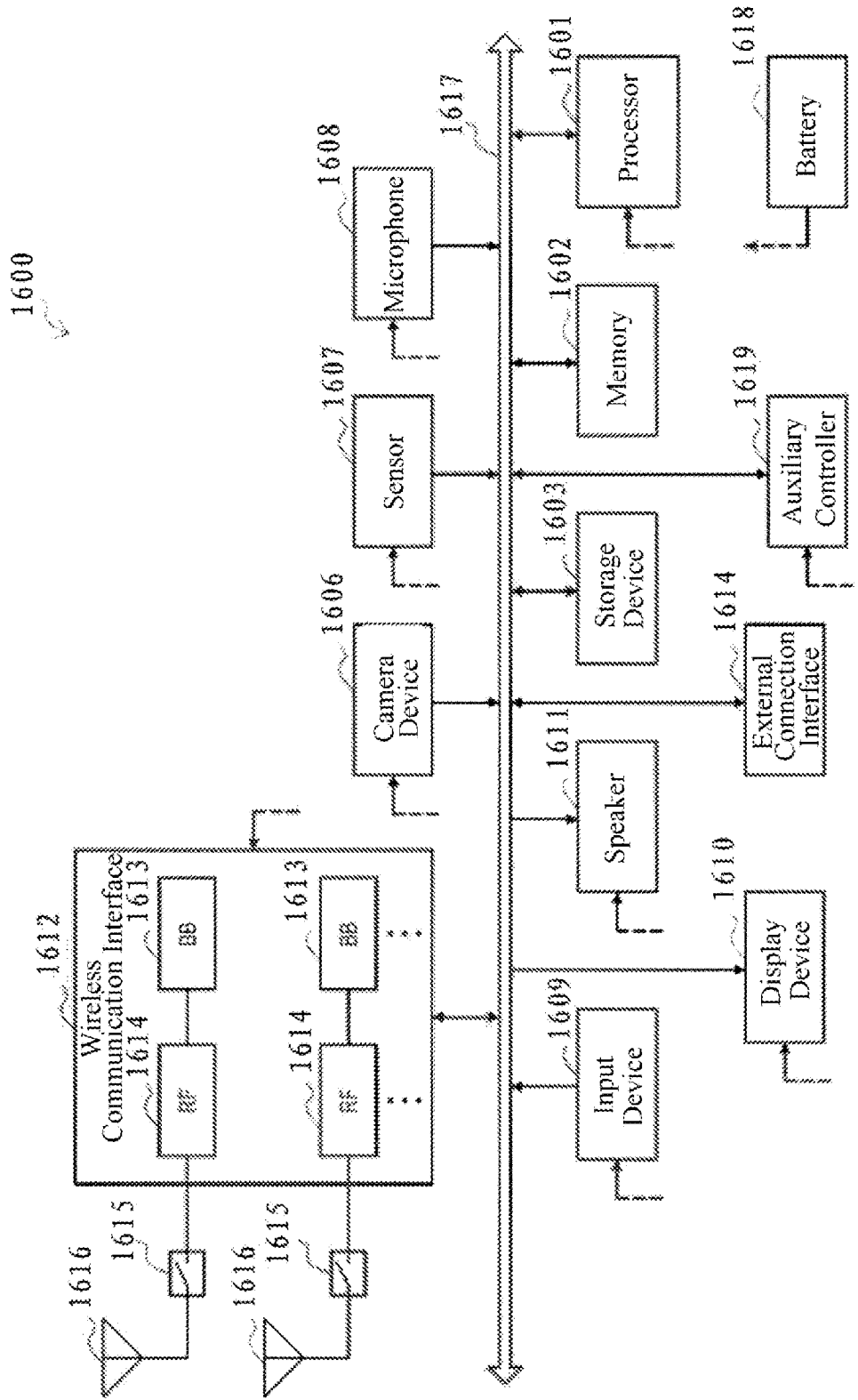
FIG. 22 is a block diagram showing an example of a schematic configuration of a smart phone to which the technology of the present disclosure may be applied.

FIG. 22 is a block diagram showing an example of schematic configuration of a smart phone 1600 to which the technology of the present disclosure may be applied. The smart phone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618 and an auxiliary controller 1619.

The processor 1601 may be, for example, a CPU or a system on chip (SoC), and controls functions of an application layer and another layer of the smart phone 1600. The memory 1602 includes a RAM and a ROM, and stores a program that is executed by the processor 1601, and data. The storage device 1603 may include a storage medium such as a semiconductor memory and a hard disk. The external connection interface 1604 is an interface for connecting an external device (such as a memory card and a universal serial bus (USB) device) to the smart phone 1600.

The camera device 1606 includes an image sensor (such as a charge coupled device (CCD) and a complementary metal oxide semiconductor (CMOS)), and generates a captured image. The sensor 1607 may include a group of sensors such as a measurement sensor, a gyro sensor, a geomagnetic sensor, and an acceleration sensor. The microphone 1608 converts sounds that are inputted to the smart phone 1600 into audio signals. The input device 1609 includes, for example, a touch sensor configured to detect touch onto a screen of the display device 1610, a keypad, a keyboard, a button, or a switch, and receive an operation or information inputted from a user. The display device 1610 includes a screen (such as a liquid crystal display (LCD) and an organic light-emitting diode (OLED) display), and displays an output image of the smart phone 1600. The speaker 1611 converts audio signals that are outputted from the smart phone 1600 to sounds.

The wireless communication interface 1612 supports any cellular communication solution (such as LTE and LTE-advanced and new radio NR), and performs wireless communication. The wireless communication interface 1612 may typically include for example a BB processor 1613 and an RF circuit 1614. The BB processor 1613 may perform for example coding/decoding, modulation/demodulation and multiplexing/de-multiplexing, and perform various types of signal processes for wireless communication. In addition, the RF circuit 1614 may include for example, a mixer, a filter and an amplifier, and transmits and receives a wireless signal via the antenna 1616. The wireless communication interface 1612 may be a chip module having the BB processor 1613 and the RF circuit 1614 integrated thereon. The wireless communication interface 1612 may include multiple BB processors 1613 and multiple RF circuits 1614, as shown in FIG. 22. Although FIG. 22 shows the example in which the wireless communication interface 1612 includes the multiple BB processors 1613 and the multiple RF circuits 1614, the wireless communication interface 1612 may also include a single BB processor 1613 or a single RF circuit 1614.

Furthermore, in addition to the cellular communication solution, the wireless communication interface 1612 may support another type of wireless communication solution, such as short-range wireless communication solution, a near field communication solution and a wireless local area network (LAN) solution. In that case, the wireless communication interface 1612 may include the BB processor 1613 and the RF circuit 1614 for each wireless communication solution.

Each of the antenna switches 1615 switches connection destinations of the antennas 1616 among multiple circuits (such as circuits for different wireless communication solutions) included in the wireless communication interface 1612.

Each of the antennas 1616 includes a single or multiple antenna elements (such as multiple antenna elements included in an MIMO antenna), and is used for the wireless communication interface 1612 to transmit and receive wireless signals. The smart phone 1600 may include the multiple antennas 1616, as shown in FIG. 22. Although FIG. 22 shows the example in which the smart phone 1600 includes the multiple antennas 1616, the smart phone 1600 may also include a single antenna 1616.

Furthermore, the smart phone 1600 may include the antenna 1616 for each wireless communication solution. In this case, the antenna switches 1615 may be omitted from the configuration of the smart phone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to blocks of the smart phone 1600 shown in FIG. 22 via feeder lines, which are partially shown as dashed lines in the figure. The auxiliary controller 1619 operates a minimum necessary function of the smart phone 1600, for example, in a sleep mode.

In the smart phone 1600 shown in FIG. 22, the communication unit of the device at the user equipment side described above may be implemented by the wireless communication interface 1612. At least a part of the functions of the device at the user equipment side described above may also be implemented by the processor 1601 or the auxiliary controller 1619.

Second Application Example

Figure 23:
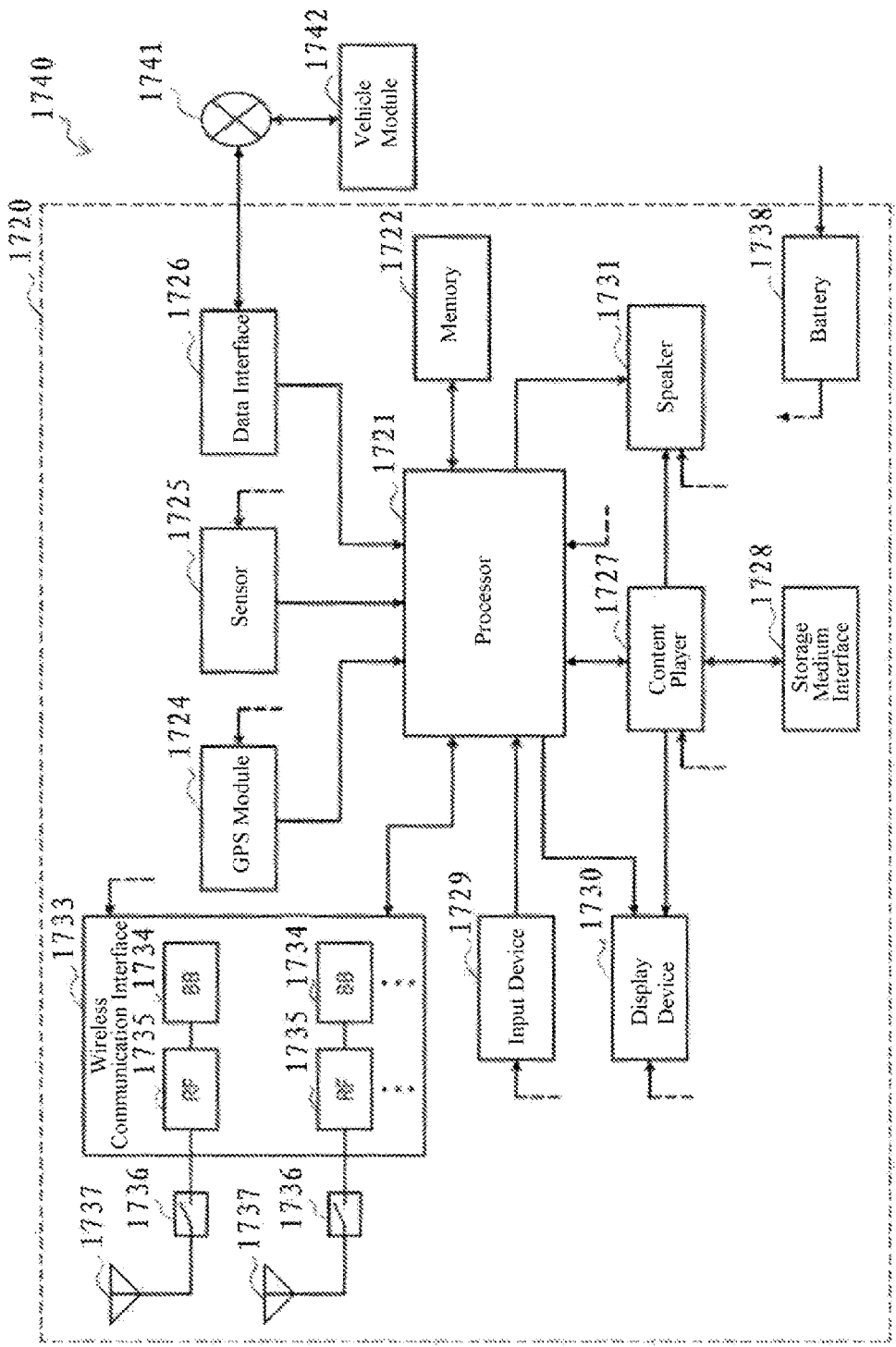
FIG. 23 is a block diagram showing an example of a schematic configuration of a vehicle navigation apparatus to which the technology of the present disclosure may be applied.

FIG. 23 is a block diagram showing an example of a schematic configuration of a vehicle navigation apparatus 1720 to which the technology of the present disclosure may be applied. The vehicle navigation apparatus 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a wireless communication interface 1733, one or more antenna switches 1736, one or more antennas 1737 and a battery 1738.

The processor 1721 may be for example a CPU or a SoC, and controls a navigation function and additional function of the vehicle navigation apparatus 1720. The memory 1722 includes a RAM and a ROM, and stores programs executed by the processor 1721, and data.

The GPS module 1724 uses GPS signals received from a GPS satellite to measure a position (such as latitude, longitude and altitude) of the vehicle navigation apparatus 1720. The sensor 1725 may include a group of sensors such as a gyroscope sensor, a geomagnetic sensor and an air pressure sensor. The data interface 1726 is connected to, for example, an in-vehicle network 1741 via a terminal that is not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or information inputted from a user. The display device 1730 includes a screen such as a LCD display or an OLED display, and displays an image of the navigation function or content that is reproduced. The speaker 1731 outputs sounds of the navigation function or the content that is reproduced.

The wireless communication interface 1733 supports any cellular communication solution (such as LTE and LTE-advanced and new radio NR), and performs wireless communication. The wireless communication interface 1733 usually may include for example a BB processor 1734 and an RF circuit 1735. The BB processor 1734 may perform for example coding/decoding, modulation/demodulation and multiplexing/de-multiplexing, and perform various types of signal processes for wireless communication. In addition, the RF circuit 1735 may include for example a mixer, a filter and an amplifier, and transmits and receives a wireless signal via the antenna 1737. The wireless communication interface 1733 may also be one chip module that has the BB processor 1734 and the RF circuit 1735 integrated thereon. The wireless communication interface 1733 may include multiple BB processors 1734 and multiple RF circuits 1735, as shown in FIG. 23. Although FIG. 23 shows the example in which the wireless communication interface 1733 includes the multiple BB processors 1734 and the multiple RF circuits 1735, the wireless communication interface 1733 may also include a single BB processor 1734 or a single RF circuit 1735.

Furthermore, in addition to the cellular communication solution, the wireless communication interface 1733 may support another type of wireless communication solutions, such as a short-distance wireless communication solution, a near field communication solution and a wireless LAN solution. In that case, the wireless communication interface 1733 may include the BB processor 1734 and the RF circuit 1735 for each wireless communication solution.

Each of the antenna switches 1736 switches connection destinations of the antennas 1737 among multiple circuits (such as circuits for different wireless communication solutions) included in the wireless communication interface 1733.

Each of the antennas 1737 includes single or more antenna elements (such as multiple antenna elements included in a MIMO antenna) and is used by the wireless communication interface 1733 to transmit and receive a wireless signal. The vehicle navigation apparatus 1720 may include multiple antennas 1737, as shown in FIG. 23. Although FIG. 23 shows the example in which the vehicle navigation apparatus 1720 includes the multiple antennas 1737, the vehicle navigation apparatus 1720 may also include a single antenna 1737.

Furthermore, the vehicle navigation apparatus 1720 may include the antenna 1737 for each wireless communication solution. In this case, the antenna switches 1736 may be omitted from the configuration of the vehicle navigation apparatus 1720.

The battery 1738 supplies power to blocks of the vehicle navigation apparatus 1720 shown in FIG. 23 via feeder lines, which are partially shown as dashed lines in the figure. The battery 1738 accumulates power supplied from the vehicle.

In the vehicle navigation apparatus 1720 shown in FIG. 23, the communicating unit of the device at the user equipment side described above may be implemented by the communication interface 1733. At least part of functions of the device at the user equipment side above described may also be implemented by processor 1721.

The technology of the present disclosure may be implemented as a in-vehicle system (or a vehicle) 1740 including one or more of the vehicle navigation apparatus 1720, the in-vehicle network 1741 and a vehicle module 1742. The vehicle module 1742 generates vehicle data (such as vehicle speed, engine speed, and trouble information), and outputs the generated data to the in-vehicle network 1741.

Preferred embodiments of the disclosure have been described above with reference to the drawings, but the disclosure is not limited to the above examples of course. Those skilled in the art can make various changes and modifications within the scope of the appended claims, and it should be understood that such changes and modifications naturally fall within the technical scope of the present disclosure.

For example, multiple functions of one unit in the above embodiment may be realized with separate devices. Alternatively, multiple functions of multiple unit in the above embodiments may be implemented with separate device. Furthermore, one of the above functions may be implemented by multiple units. Needless to say, such configuration is included in the technical scope of the present disclosure.

In the specification, steps described in the flow diagram include not only the processing performed chronologically, but also the processing performed in parallel or individually rather than chronologically. In addition, as a matter of course, the sequence may be properly changed even in steps of processing in accordance with a time sequence.

Although the present disclosure and advantages of the present disclosure have been described in detail, it should be understood that, various changes, substitutions and alterations can be made herein without departing from the spirit and scope of the disclosure as defined by the appended claims. Finally, the term "include", "comprise" or any variant thereof in the embodiments of the present disclosure is intended to encompass nonexclusive inclusion, so that a process, a method, an article or a device including a series of elements includes not only those elements but also other elements which have been not listed definitely or an element(s) inherent to the process, the method, the article or the device. Without limiting more, the elements defined by the statement "comprising one . . . " do not exclude that there are other identical elements in the process, method, article, or device that includes said elements.

The invention claimed is:

1. A device in a wireless communication system, the wireless communication system comprising a first base station operating on a licensed band and one or more second base stations operating on an unlicensed band, the device comprising processing circuitry configured to:
    select, based on a distance between each of the one or more second base stations and the user equipment, a first number of second base stations from the one or more second base stations;
    instruct, based on position information of the one or more second base stations and position information of a user equipment, the first number of base stations from the one or more second base stations to perform clear channel assessment for the unlicensed band, so that the first number of base stations from the one or more second base stations control access to the unlicensed band based on information about a result of clear channel assessment;
    instruct the first number of second base stations to perform omni-directional clear channel assessment and add a second base station a result of clear channel assessment of which satisfies a predetermined condition into a first set;
    determine, based on number of second base stations contained in the first set, access to the unlicensed band of the first number of second base stations; and
    notify a result of the determining to the first number of second base stations as the information about the result of clear channel assessment.

2. The device according to claim 1, wherein the processing circuitry is further configured to:
    determine, if the first set is null, a predetermined second number of second base stations, which are closest to the user equipment and/or downlink channel qualities with respect to the user equipment of which are best, among the first number of second base stations, to access to the unlicensed band;

determine, if the number of the second base stations in the first set is larger than 0 and smaller than 3, a predetermined second number of second base stations, which are closest to the user equipment and/or downlink channel qualities with respect to the user equipment of which are best, excluding the second base stations in the first set, among the first number of second base stations, to access to the unlicensed band; and determine, if the number of the second base stations in the first set is larger than or equal to 3, position information of an interfering point based on position information and results of clear channel assessment of three second base stations, magnitudes of the results of clear channel assessment of which are largest, in the first set, and determine, according to geometrical relationship between the position information of each of the first number of second base stations and the position information of the interfering point and the position information of the user equipment, second base stations the geometrical relationship of which satisfies a predetermined condition among the first number of second base stations to access to the unlicensed band.

3. The device according to claim 2, wherein the predetermined condition satisfied by the geometrical relationship is that a distance between the user equipment and the interfering point and an angle of a transmission beam from the second base station to the user equipment which deviates from the interfering point each are larger than a predetermined threshold.

4. The device according to claim 2, wherein the processing circuitry is further configured to:

determine a beam sweeping range based on the position information of the interfering point, and to notify the determined beam sweeping range to the second base stations which are determined to access to the unlicensed band and the user equipment, so that the second base stations which are determined to access to the unlicensed band and the user equipment perform transmission/reception beam sweeping according to the beam sweeping range; or control the second base stations which are determined to access to the unlicensed band to perform coordinated multi-point transmission with respect to the user equipment.

5. A device in a wireless communication system, the wireless communication system comprising a first base station operating on a licensed band and one or more second base stations operating on an unlicensed band, the device comprising processing circuitry configured to:

select, based on a distance between each of the one or more second base stations and the user equipment, a first number of second base stations from the one or more second base stations; and instruct, based on position information of the one or more second base stations and position information of a user equipment, the first number of base stations from the one or more second base stations to perform clear channel assessment for the unlicensed band, so that the first number of base stations from the one or more second base stations control access to the unlicensed band based on information about a result of clear channel assessment, wherein the processing circuitry is further configured to instruct the first number of second base stations to perform beamforming-based clear channel assessment, so that the first number of second base stations determine access to the unlicensed band by themselves based on results of clear channel assessment as the information about the result of clear channel assessment.

6. The device according to claim 5, wherein the processing circuitry is further configured to control, based on reporting results from the second base stations determined to be able to access to the unlicensed band, the second base stations determined to be able to access to the unlicensed band to perform coordinated multi-point transmission with respect to the user equipment.

7. A device in a wireless communication system, the wireless communication system comprising a first base station operating on a licensed band and one or more second base stations operating on an unlicensed band, the device comprising processing circuitry configured to:

perform clear channel assessment for the unlicensed band according to an instruction made by the first base station based on position information of the one or more second base stations and position information of a user equipment;

control, based on information about a result of clear channel assessment, access to the unlicensed band of a second base station in which the device is located, wherein the second base station in which the device is located is contained in a first number of second base stations, which are selected, by the first base station, from the one or more second base stations based on a distance between each of the one or more second base stations and the user equipment;

perform omni-directional clear channel assessment according to the instruction from the first base station and report the result of clear channel assessment to the first base station; and control, according to an instruction made by the first base station based on the result of clear channel assessment, access to the unlicensed band of the second base station in which the device is located.

8. The device according to claim 7, wherein the processing circuitry is further configured to control, according to a beam sweeping range notified from the first base station, the second base station in which the device is located to perform transmission beam sweeping with respect to the user equipment within the beam sweeping range, the beam sweeping range being determined based on position information of an interfering point.

9. The device according to claim 7, wherein the processing circuitry is further configured to:

perform beamforming-based clear channel assessment according to the instruction from the base station;

determine position information of an interfering point based on the result of clear channel assessment; and control, based on geometrical relationship between position information of the second base station in which the device is located and the position information of the interfering point and position information of the user equipment notified from the first base station, access to the unlicensed band of the second base station in which the device is located.

10. The device according to claim 9, wherein the processing circuitry is further configured to:

when it is determined that there is no interfering point based on the result of clear channel assessment determine the second base station in which the device is located to able to access to the unlicensed band; or when it is determined that there is the interfering point based on the result of clear channel assessment, determine a transmission beam from the second base station in which the device is located to the user equipment further based on the geometrical relationship between the position information of the second base station in which the device is located and the position information of the interfering point and the position information of the user equipment notified from the first base station.

11. The device according to claim 9, wherein the processing circuitry is further configured to determine, if the geometrical relationship allows each of a distance between the user equipment and the interfering point and an angle of a transmission beam from the second base station in which the device is located to the user equipment which deviates from the interfering point to be larger than a predetermined threshold, the second base station in which the device is located to be able to access to the unlicensed band.

12. The device according to claim 11, wherein the processing circuitry is further configured to: report to the first base station a determination result that the second base station in which the device is located is able to access to the unlicensed band, for the first base station to control coordinated multi-point transmission with respect to the user equipment.

13. The device according to claim 7, wherein the processing circuitry is further configured to control, according to an instruction from the first base station, the second base station in which the device is located to perform, together with other second base stations, coordinated multi-point transmission with respect to the user equipment.

14. A device in a wireless communication system, the wireless communication system comprising a first base station operating on a licensed band and one or more second base stations operating on an unlicensed band, the device comprising processing circuitry configured to:

report, according to an instruction from the first base station, position information of a user equipment to the first base station in real time, for the first base station to instruct, based on position information of the one or more second base stations and the position information of the user equipment, the one or more second base stations to perform clear channel assessment for the unlicensed band, so that the one or more second base stations control access to the unlicensed band based on information about a result of clear channel assessment.

15. The device according to claim 14, wherein the processing circuitry is further configured to: control, based on a beam sweeping range notified from the first base station and information related to a second base station determined to access to the unlicensed band, the user equipment to perform reception beam sweeping with respect to the second base station determined to access to the unlicensed band, the beam sweeping range being determined based on position information of an interfering point.

16. The device according to claim 14, wherein the processing circuitry is further configured to: actively report, in a case that variation in the position information of the user equipment exceeds a predetermined threshold, current position information of the user equipment the first base station, for the first base station to update an instruction for the one or more second base stations to perform clear channel assessment for the unlicensed band.

* * * * *